United States Patent
Ko et al.

(10) Patent No.: US 11,088,801 B2
(45) Date of Patent: *Aug. 10, 2021

(54) METHOD OF TRANSMITTING REFERENCE SIGNAL FOR CHANNEL STATE CHANGE MEASUREMENT AND APPARATUS THEREFOR

(71) Applicant: LG ELECTRONICS INC., Seoul (KR)

(72) Inventors: Hyunsoo Ko, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/065,125

(22) PCT Filed: Jan. 5, 2018

(86) PCT No.: PCT/KR2018/000238
§ 371 (c)(1),
(2) Date: Jun. 21, 2018

(87) PCT Pub. No.: WO2018/128453
PCT Pub. Date: Jul. 12, 2018

(65) Prior Publication Data
US 2019/0199487 A1     Jun. 27, 2019

Related U.S. Application Data

(60) Provisional application No. 62/444,306, filed on Jan. 9, 2017.

(51) Int. Cl.
*H04L 5/00*    (2006.01)
*H04L 27/26*    (2006.01)
(Continued)

(52) U.S. Cl.
CPC ......... *H04L 5/0051* (2013.01); *H04B 7/0417* (2013.01); *H04L 1/0026* (2013.01);
(Continued)

(58) Field of Classification Search
CPC ..... H04L 5/005; H04L 5/0053; H04L 5/0094; H04L 27/2613; H04L 1/0027;
(Continued)

(56) References Cited

U.S. PATENT DOCUMENTS 7,894,330 B2 *   2/2011   Lee .................. H04L 1/1854
                                                              370/208
8,699,618 B2    4/2014   Park et al.
(Continued)

FOREIGN PATENT DOCUMENTS

CN    102638892    8/2012
CN    102859900    1/2013
(Continued)

OTHER PUBLICATIONS

PCT International Application No. PCT/KR2018/000152, Written Opinion of the International Searching Authority dated Apr. 9, 2018, 11 pages.
(Continued)

*Primary Examiner* — Dung B Huynh
(74) *Attorney, Agent, or Firm* — Lee, Hong, Degerman, Kang & Waimey PC

(57) ABSTRACT

Disclosed herein is a method of transmitting a reference signal for channel state change measurement and an apparatus therefor. The method includes receiving, from a transmitter, a first type reference signal of a first resource mapping pattern and a second type reference signal of a second resource mapping pattern. The receiver receives the first type reference signal under an assumption that the first
(Continued)

type reference signal is associated with the second type reference signal, when a specific condition is satisfied.

14 Claims, 20 Drawing Sheets

(51) Int. Cl.
H04B 7/0417 (2017.01)
H04L 1/00 (2006.01)
H04W 72/04 (2009.01)
H04B 7/04 (2017.01)
H04W 56/00 (2009.01)

(52) U.S. Cl.
CPC ............ *H04L 5/005* (2013.01); *H04L 5/0057* (2013.01); *H04L 27/2613* (2013.01); *H04W 72/0446* (2013.01); *H04B 7/04* (2013.01); *H04L 1/0001* (2013.01); *H04W 56/001* (2013.01)

(58) Field of Classification Search
CPC ... H04L 1/0001; H04L 1/0026; H04L 5/0044; H04L 5/0051; H04L 5/0057; H04W 72/042; H04W 72/0446; H04W 56/001; H04B 7/04; H04B 7/0417
See application file for complete search history.

(56) References Cited

U.S. PATENT DOCUMENTS

| | | | | |
|---|---|---|---|---|
| 8,761,075 B2* | 6/2014 | Kim | | H04L 5/0048 370/315 |
| 9,287,905 B2* | 3/2016 | Kim | | H04L 5/0044 |
| 9,425,946 B2 | 8/2016 | Pourahmadi et al. | | |
| 9,648,588 B2 | 5/2017 | Kim et al. | | |
| 9,667,395 B2 | 5/2017 | Jongren et al. | | |
| 9,936,486 B2 | 4/2018 | You et al. | | |
| 10,142,074 B2 | 11/2018 | Wang et al. | | |
| 10,484,072 B1* | 11/2019 | Nammi | | H04B 7/0486 |
| 2010/0254434 A1* | 10/2010 | Iwai | | H04L 1/1861 375/141 |
| 2011/0235743 A1* | 9/2011 | Lee, II | | H04J 11/00 375/295 |
| 2011/0305295 A1* | 12/2011 | Kim | | H04L 5/0044 375/295 |
| 2012/0033624 A1* | 2/2012 | Luo | | H04B 7/024 370/329 |
| 2012/0039282 A1* | 2/2012 | Kim | | H04W 52/54 370/329 |
| 2012/0058791 A1* | 3/2012 | Bhattad | | H04L 5/0016 455/509 |
| 2012/0076106 A1* | 3/2012 | Bhattad | | H04L 5/005 370/330 |
| 2012/0120891 A1* | 5/2012 | Mazzarese | | H04W 72/042 370/329 |
| 2012/0188955 A1* | 7/2012 | Zhang | | H04L 5/005 370/329 |
| 2012/0195286 A1* | 8/2012 | Kim | | H04L 5/0048 370/330 |
| 2012/0207126 A1* | 8/2012 | Qu | | H04L 5/0005 370/330 |
| 2012/0287875 A1* | 11/2012 | Kim | | H04W 76/27 370/329 |
| 2012/0300740 A1* | 11/2012 | Iwai | | H04J 13/0062 370/329 |
| 2012/0315859 A1* | 12/2012 | Lee, II | | H04L 5/0051 455/67.13 |
| 2013/0021991 A1* | 1/2013 | Ko | | H04W 72/048 370/329 |
| 2013/0039332 A1* | 2/2013 | Nazar | | H04W 72/04 370/330 |
| 2013/0064227 A1* | 3/2013 | Iwai | | H04J 13/0055 370/335 |
| 2013/0070634 A1* | 3/2013 | Gao | | H04B 17/345 370/252 |
| 2013/0142156 A1* | 6/2013 | Mazzarese | | H04W 72/04 370/329 |
| 2013/0196675 A1* | 8/2013 | Xiao | | H04B 17/309 455/452.1 |
| 2013/0201926 A1* | 8/2013 | Nam | | H04L 5/0055 370/329 |
| 2013/0208677 A1* | 8/2013 | Lee | | H04W 52/325 370/329 |
| 2013/0208678 A1* | 8/2013 | Zhang | | H04L 5/0053 370/329 |
| 2013/0242896 A1* | 9/2013 | Son | | H04B 7/0452 370/329 |
| 2013/0244676 A1* | 9/2013 | Koivisto | | H04L 5/0048 455/452.1 |
| 2013/0336282 A1* | 12/2013 | Nakano | | H04B 7/0456 370/330 |
| 2014/0003479 A1* | 1/2014 | Huang | | H04B 1/1027 375/224 |
| 2014/0086085 A1* | 3/2014 | Zheng | | H04L 5/0092 370/252 |
| 2014/0112253 A1* | 4/2014 | Nagata | | H04L 5/005 370/328 |
| 2014/0185527 A1* | 7/2014 | Kim | | H04L 5/0057 370/328 |
| 2014/0247749 A1* | 9/2014 | Kim | | H04B 7/0626 370/252 |
| 2014/0293900 A1* | 10/2014 | Takeda | | H04L 5/0073 370/329 |
| 2014/0355548 A1* | 12/2014 | Xia | | H04L 5/0053 370/329 |
| 2015/0003343 A1* | 1/2015 | Li | | H04B 7/0617 370/329 |
| 2015/0029874 A1* | 1/2015 | Davydov | | H04W 28/24 370/252 |
| 2015/0036631 A1* | 2/2015 | Yang | | H04L 27/2601 370/329 |
| 2015/0092582 A1* | 4/2015 | Liao | | H04L 27/2613 370/252 |
| 2015/0131560 A1* | 5/2015 | Von Elbwart | | H04W 72/042 370/329 |
| 2015/0230211 A1* | 8/2015 | You | | H04L 5/0051 370/330 |
| 2015/0237602 A1* | 8/2015 | Chae | | H04B 7/08 370/329 |
| 2015/0245326 A1* | 8/2015 | Rune | | H04L 1/0003 370/329 |
| 2015/0249517 A1* | 9/2015 | Seo | | H04W 72/042 370/329 |
| 2015/0270918 A1* | 9/2015 | Lee | | H04L 1/0038 370/329 |
| 2015/0280872 A1* | 10/2015 | Berggren | | H04L 5/0023 370/330 |
| 2015/0318969 A1* | 11/2015 | Morioka | | H04L 5/0048 370/336 |
| 2015/0365992 A1* | 12/2015 | Lim | | H04W 24/10 370/329 |
| 2016/0036542 A1* | 2/2016 | Gong | | H04B 17/345 370/329 |
| 2016/0057742 A1* | 2/2016 | Berggren | | H04L 5/0048 370/329 |
| 2016/0100398 A1 | 4/2016 | Xia et al. | | |
| 2017/0093538 A1* | 3/2017 | Yoon | | H04B 7/0626 |
| 2017/0111880 A1* | 4/2017 | Park | | H04W 4/02 |
| 2017/0117998 A1* | 4/2017 | Jitsukawa | | H04B 7/04 |
| 2017/0141896 A1* | 5/2017 | Yang | | H04B 7/12 |
| 2017/0201989 A1* | 7/2017 | Fakoorian | | H04L 5/0048 |
| 2017/0208588 A1* | 7/2017 | Park | | H04L 27/26 |
| 2017/0214518 A1* | 7/2017 | Oh | | H04L 25/03012 |
| 2017/0294926 A1* | 10/2017 | Islam | | H04L 5/0051 |
| 2017/0302495 A1* | 10/2017 | Islam | | H04L 27/2675 |
| 2018/0041259 A1* | 2/2018 | Kim | | H04W 72/042 |
| 2018/0041321 A1* | 2/2018 | Guo | | H04L 5/0048 |

(56) References Cited

U.S. PATENT DOCUMENTS

| | | | |
|---|---|---|---|
| 2018/0083745 A1* | 3/2018 | Sun | H04L 5/005 |
| 2018/0091350 A1* | 3/2018 | Akkarakaran | G01S 13/346 |
| 2018/0123657 A1* | 5/2018 | Kundargi | H04B 7/0452 |
| 2018/0145854 A1* | 5/2018 | Akkarakaran | H04L 27/2613 |
| 2018/0167237 A1* | 6/2018 | Gudovskiy | H04L 5/0048 |
| 2018/0205528 A1* | 7/2018 | Bai | H04L 5/0092 |
| 2018/0227867 A1* | 8/2018 | Park | H04L 5/005 |
| 2018/0241508 A1* | 8/2018 | Chervyakov | H04L 5/0051 |
| 2018/0331804 A1* | 11/2018 | Hessler | H04L 5/0007 |
| 2018/0351720 A1 | 12/2018 | Ouchi et al. | |
| 2018/0359071 A1* | 12/2018 | Lee | H04L 7/0054 |
| 2018/0367275 A1* | 12/2018 | Nammi | H04L 27/38 |
| 2019/0037480 A1* | 1/2019 | Sun | G01S 1/00 |
| 2019/0081825 A1* | 3/2019 | Pajukoski | H04L 5/0051 |
| 2019/0081844 A1* | 3/2019 | Lee | H04L 5/0048 |
| 2019/0089560 A1* | 3/2019 | Baldemair | H04L 5/0051 |
| 2019/0097776 A1* | 3/2019 | Kim | H04L 27/2611 |
| 2019/0109686 A1* | 4/2019 | Jiang | H04L 5/0048 |
| 2019/0109747 A1* | 4/2019 | Hessler | H04L 5/0051 |
| 2019/0123864 A1* | 4/2019 | Zhang | H04B 7/0695 |
| 2019/0140799 A1* | 5/2019 | Gao | H04L 5/0064 |
| 2019/0141653 A1* | 5/2019 | Lee | H04L 5/0091 |
| 2019/0182777 A1* | 6/2019 | Zhang | H04W 52/14 |
| 2019/0222385 A1* | 7/2019 | Hessler | H04L 1/0005 |
| 2019/0254020 A1* | 8/2019 | Nam | H04W 72/0413 |
| 2019/0261380 A1* | 8/2019 | Iyer | H04B 7/0695 |
| 2020/0008228 A1* | 1/2020 | Lee | H04L 5/001 |
| 2020/0029234 A1* | 1/2020 | Cirkic | H04B 17/309 |
| 2020/0083996 A1* | 3/2020 | Hunukumbure | H04L 5/0035 |
| 2020/0305129 A1* | 9/2020 | Lee | H04W 72/0446 |

FOREIGN PATENT DOCUMENTS

| | | |
|---|---|---|
| CN | 103703734 | 4/2014 |
| CN | 103733552 | 4/2014 |
| CN | 104662815 | 5/2015 |
| CN | 105122871 | 12/2015 |
| EP | 3566512 | 11/2019 |
| KR | 1020110043489 | 4/2011 |
| KR | 1020110117032 | 10/2011 |
| KR | 1020150018301 | 2/2015 |
| KR | 101577518 | 12/2015 |
| KR | 101647868 | 8/2016 |
| WO | 2012062669 | 5/2012 |
| WO | 2013049769 | 4/2013 |
| WO | 2016159673 | 10/2016 |
| WO | 2017138880 | 8/2017 |
| WO | 2018126399 | 7/2018 |

OTHER PUBLICATIONS

PCT International Application No. PCT/KR2018/000238, Written Opinion of the International Searching Authority dated Apr. 20, 2018, 10 pages.

LG Electronics, "DMRS Design Principle", 3GPP TSG RAN WG1 Meeting #87, R1-1611812, Nov. 2016, 7 pages.

Huawei, et al., "Functionalities and design of reference signal for demodulation of UL Channels", 3GPP TSG RAN WG1 Meeting #87, R1-1611246, Nov. 2016, 6 pages.

QUALCOMM, "Views on UL DMRS design", 3GPP TSG RAN WG1 Meeting #87, R1-1612050, Nov. 2016, 5 pages.

LG Electronics, "Discussion on Phase Tracking RS for Multi-Antenna", 3GPP TSG RAN WG1 Meeting #87, R1-1611811, Nov. 2016, 7 pages.

Ericsson, "Design considerations for phase noise tracking RS (PTRS)", 3GPP TSG RAN WG1 Meeting #87, R1-1612333, Nov. 2016, 5 pages.

Xinwei, "Discussion on RS Design and QCL Related Issues", 3GPP TSG RAN WG1 Meeting #87, R1-1612257, Nov. 2016, 6 pages.

NTT Docomo, "Views on RS for phase tracking", 3GPP TSG RAN WG1 Meeting #87, R1-1612720, Nov. 2016, 6 pages.

PCT International Application No. PCT/KR2018/000238, Written Opinion of the International Searching Authority dated Apr. 20, 2018, 12 pages.

LG Electronics, "Discussion on Phase Tracking RS for Multi-Antenna," 3GPP TSG-RAN WG1 #87, R1-1611811, Nov. 2016, 6 pages.

Ericsson, "Design considerations for phase noise tracking RS (PTRS)," 3GPP TSG-RAN WG1 #87, R1-1612333, Nov. 2016, 4 pages.

Xinwei, "Discussion on RS Design and QCL Related Issues," 3GPP TSG-RAN WG1 #87, R1-1612257, Nov. 2016, 4 pages.

NTT Docomo, Inc., "Views on RS for phase tracking," 3GPP TSG-RAN WG1 #87, R1-1612720, Nov. 2016, 5 pages.

LG Electronics, "DMRS Design Issues in NR", 3GPP TSG RAN WG1 Meeting #86bis, R1-1609259, Oct. 2016, 8 pages.

Intel, "Discussion on DM-RS design for NR", 3GPP TSG RAN WG1 Meeting #86bis, R1-1610429, Oct. 2016, 7 pages.

U.S. Appl. No. 16/359,932, Office Action dated May 23, 2019, 25 pages.

U.S. Appl. No. 16/375,645, Office Action dated Jun. 7, 2019, 15 pages.

U.S. Appl. No. 16/065,108, Office Action dated Jul. 11, 2019, 19 pages.

Vihriala, et al., "Frame Structure Design for Future Millimetre Wave Mobile Radio Access", IEEE, 2016, 6 pages.

Ericsson, "Demodulation reference signal design principles", R1-1609767, 3GPP TSG-RAN WG1 #86bin, Oct. 2016, 4 pages.

Ericsson, "DMRS placement in transmission slots aggregation", R1-1612328, 3GPP TSG-RAN WG1 #87, Nov. 2016, 7 pages.

LG Electronics, "Discussion on DMRS density and structure to handle high Doppler case", R1-156894, 3GPP TSG RAN WG1 Meeting #83, Nov. 2015, 14 pages.

U.S. Appl. No. 16/375,645, Notice of Allowance dated Oct. 18, 2019, 7 pages.

European Patent Office Application Serial No. 18735957.5, Search Report dated Jan. 17, 2020, 9 pages.

European Patent Office Application Serial No. 18735833.8, Search Report dated Jan. 17, 2020, 10 pages.

Nokia et al., "On reference symbol types in NR", R1-1612854, 3GPP TSG-RAN WG1#87, Nov. 2016, 4 pages.

Mitsubishi Electric, "On common RS design between DFT-S-OFDM and OFDM", R1-1612375, 3GPP TSG-RAN WG1 #87, Nov. 2016, 4 pages.

The State Intellectual Property Office of the People's Republic of China Application Serial No. 201880003032.3, Office Action dated Dec. 3, 2020, 8 pages.

The State Intellectual Property Office of the People's Republic of China Application Serial No. 201880003032.3, Office Action dated May 17, 2021, 6 pages.

Nokia, et al., "On RS Design for Phase Tracking in NR," 3GPP TSG-RAN WG1#87, R1-1612860, Nov. 2016, 12 pages.

Ericsson, "On phase tracking in DFT-S-OFDM waveform," 3GPP TSG-RAN WG1#87, R1-1612338, Nov. 2016, 2 pages.

LG Electronics, "DMRS Design Principle", R1-1611812, 3GPP TSG RAN WG1 Meeting #87, Nov. 2016, 6 pages.

* cited by examiner

FIG. 2
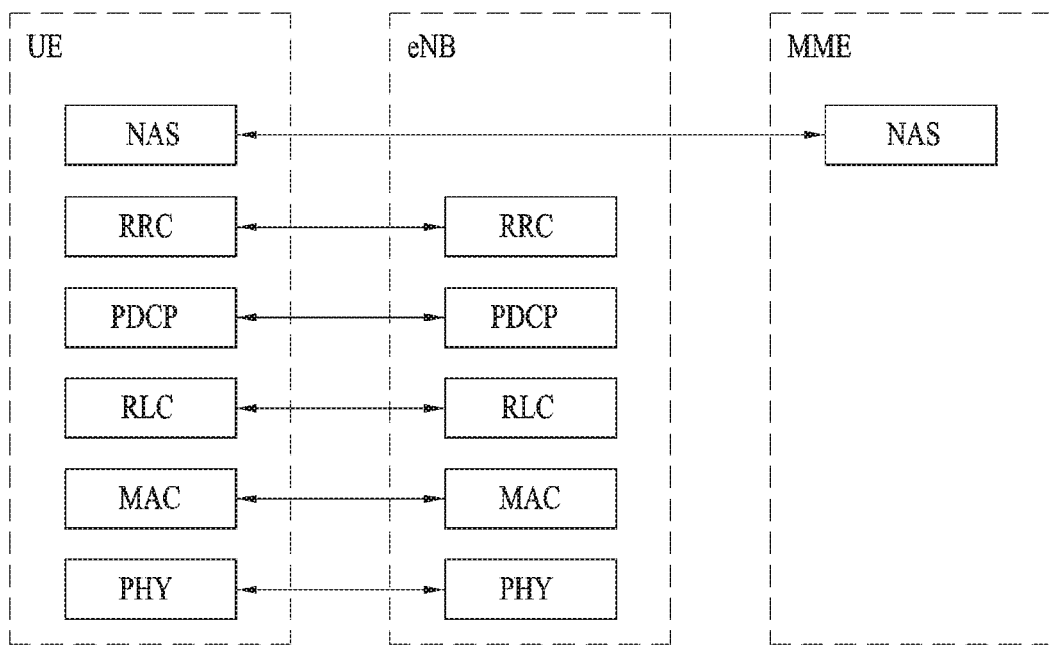
(A) CONTROL-PLANE PROTOCOL STACK
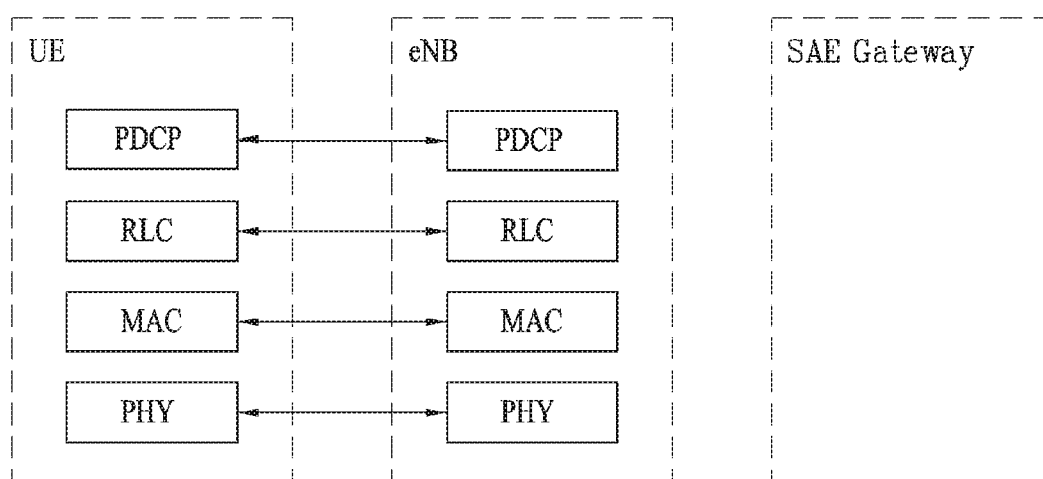
(B) USER-PLANE PROTOCOL STACK

| 0 | 1 | 2 | 3 | 4 | 5 | 6 | 7 | 8 | 9 | 10 | 11 |
|---|---|---|---|---|---|---|---|---|---|----|----|
| G1 | G1 | G2 | G2 | G1 | G1 | G2 | G2 | G1 | G1 | G2 | G2 |

(A)

| 0 | 1 | 2 | 3 | 4 | 5 | 6 | 7 | 8 | 9 | 10 | 11 |
|---|---|---|---|---|---|---|---|---|---|----|----|
| G1 | G2 | G1 | G2 | G1 | G2 | G1 | G2 | G1 | G2 | G1 | G2 |

(B)

METHOD OF TRANSMITTING REFERENCE SIGNAL FOR CHANNEL STATE CHANGE MEASUREMENT AND APPARATUS THEREFOR

CROSS-REFERENCE TO RELATED APPLICATIONS

This application is the National Stage filing under 35 U.S.C. 371 of International Application No. PCT/KR2018/000238, filed on Jan. 5, 2018, which claims the benefit of U.S. Provisional Application No. 62/444,306, filed on Jan. 9, 2017, the contents of which are all hereby incorporated by reference herein in their entirety.

TECHNICAL FIELD

The present invention relates to a method of transmitting a reference signal for channel state change measurement and an apparatus therefor, and, more particularly, to a method of transmitting a reference signal for channel state change measurement in a specific subframe group, and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a method of transmitting a reference signal for channel state change measurement and an apparatus therefor.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

The object of the present invention can be achieved by providing a method of receiving reference signals at a receiver in a wireless communication system including receiving, from a transmitter, a first type reference signal of a first resource mapping pattern and a second type reference signal of a second resource mapping pattern, and wherein, when a specific condition is satisfied, the receiver receives the first type reference signal under an assumption that the first type reference signal is associated with the second type reference signal.

At this time, the first type reference signal includes a phase tracking reference signal (PTRS), and the second type reference signal is one of a channel state information-reference signal (CSI-RS), a common reference signal (CRS) and a demodulation reference signal (DM-RS).

In addition, the first type reference signal and the second type reference signal are generated using a same type of reference signal sequences. And the first type reference signal is received when an indication indicating the first type reference signal being used is received.

In addition, when the specific condition is satisfied, the receiver receives the first type reference signal and the second reference signal under an assumption that a first antenna port for the first type reference signal is associated with a second antenna port for the second type reference signal.

In addition, the second type reference signal may be mapped to one or more OFDM symbols located at the same location in a plurality of subframes included in a subframe group.

In addition, wherein the first type reference signal is not received through a resource element for the second type reference signal, and the method may further comprise demodulating a data based on the first type reference signal and the second type reference signal.

In addition, the second resource mapping pattern takes more resource units than the first resource mapping pattern.

In another aspect of the present invention, provided herein is an apparatus for receiving a reference signal in a wireless communication system including a radio frequency (RF)

module configured to transmit and receive an RF signal to and from a transmitter and a processor connected to the RF module, wherein the processor configured to receive a first type reference signal of a first resource mapping pattern and a second type reference signal of a second resource mapping pattern, and wherein, when a specific condition is satisfied, the apparatus receives the first type reference signal under an assumption that the first type reference signal is associated with the second type reference signal.

At this time, the first type reference signal includes a phase tracking reference signal (PTRS), and the second type reference signal is one of a channel state information-reference signal (CSI-RS), a common reference signal (CRS) and a demodulation reference signal (DM-RS).

In addition, the first type reference signal and the second type reference signal are generated using a same type of reference signal sequences. And the first type reference signal is received when an indication indicating the first type reference signal being used is received.

In addition, when the specific condition is satisfied, the receiver receives the first type reference signal and the second reference signal under an assumption that a first antenna port for the first type reference signal is associated with a second antenna port for the second type reference signal.

In addition, the second type reference signal may be mapped to one or more OFDM symbols located at the same location in a plurality of subframes included in a subframe group.

In addition, wherein the first type reference signal is not received through a resource element for the second type reference signal.

In addition, the second resource mapping pattern takes more resource units than the first resource mapping pattern.

It will be appreciated by persons skilled in the art that the effects that can be achieved with the present disclosure are not limited to what has been particularly described hereinabove and other advantages of the present disclosure will be more clearly understood from the following detailed description.

Advantageous Effects

According to the present invention, even when an uplink transmission region and a downlink transmission region are dynamically changed and beam properties are dynamically changed, it is possible to efficiently measure time-varying properties of a channel.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE

Figure 1:
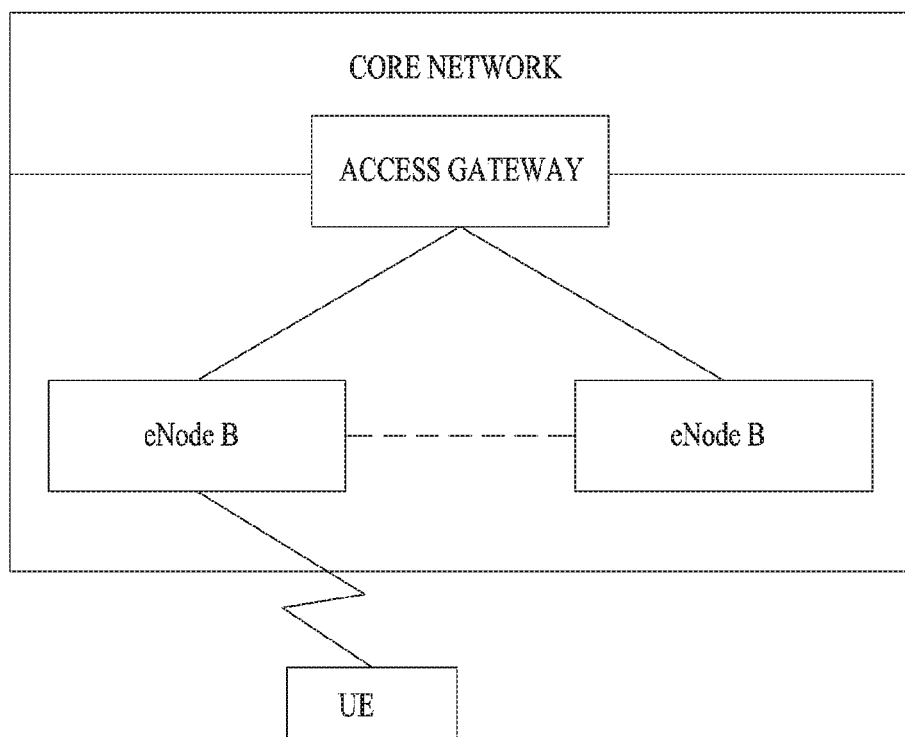
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
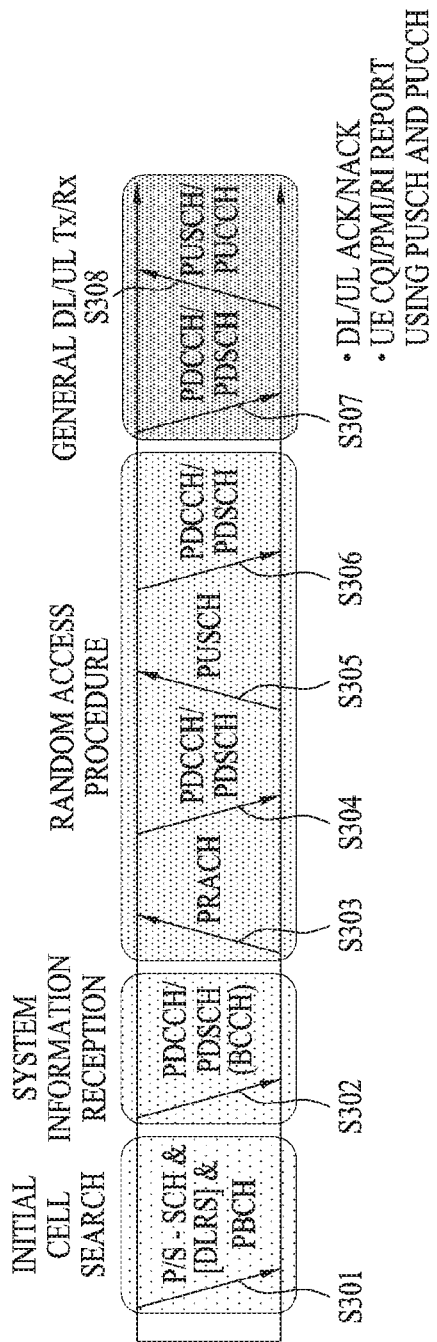
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
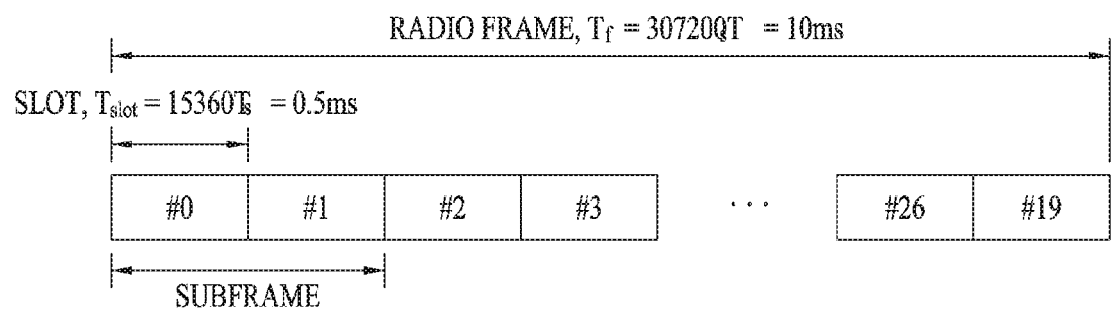
FIG. 4 illustrates a structure of a radio frame in a Long Term Evolution (LTE) system.

FIG. 4 illustrates a structure of a radio frame used in the LTE system. Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)$ =$3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
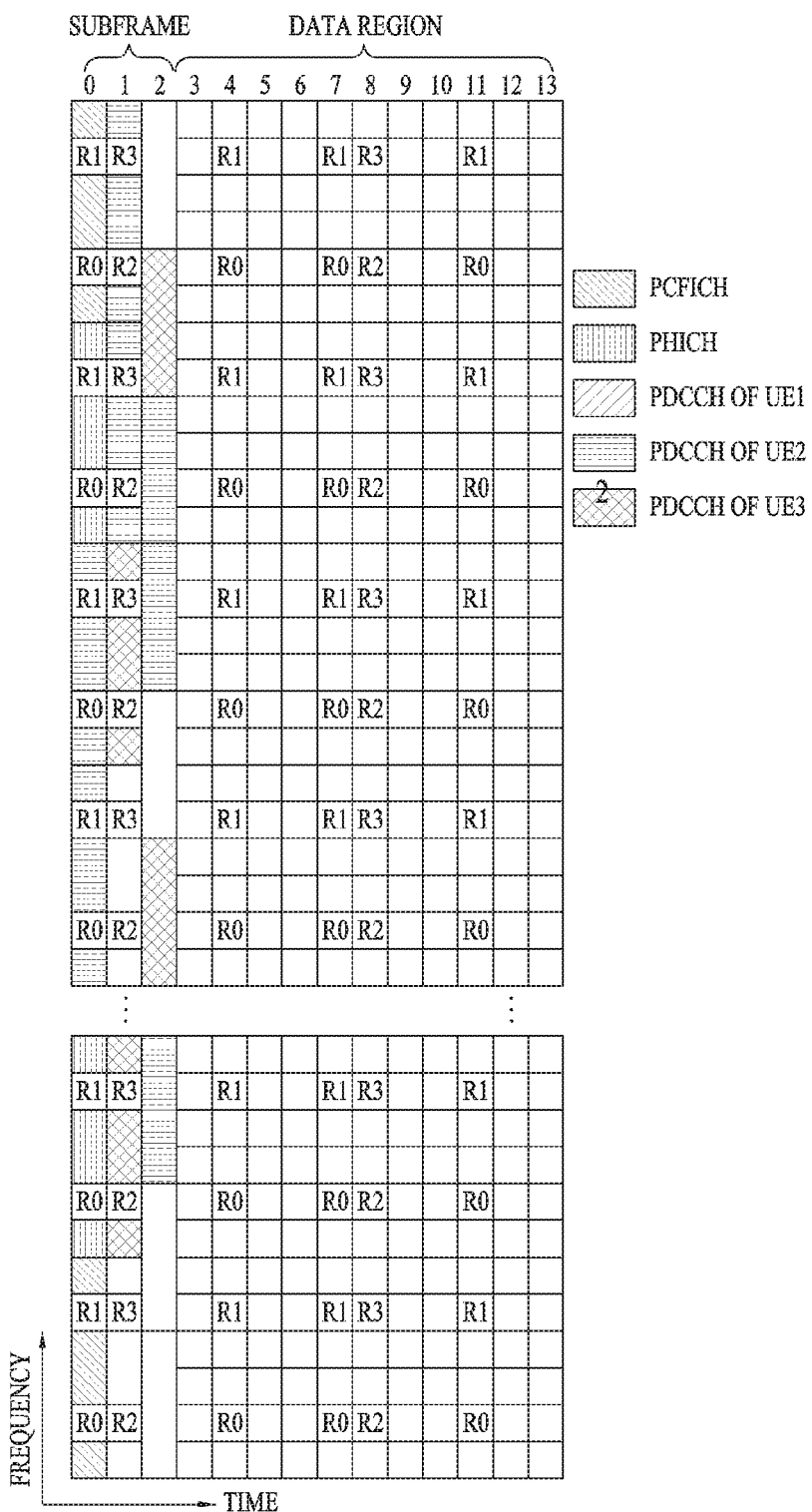
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
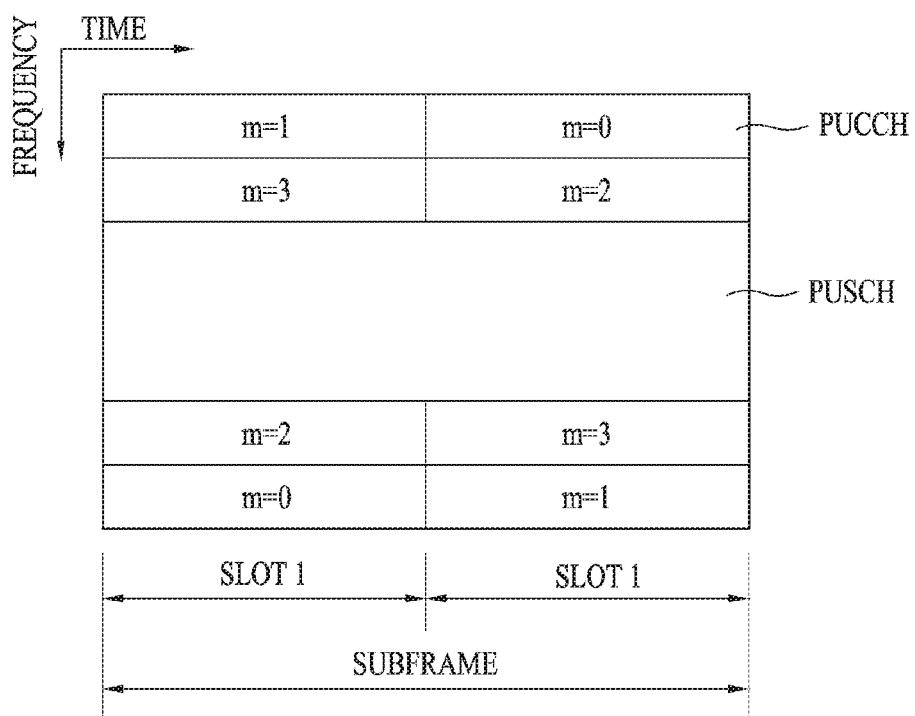
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 7:
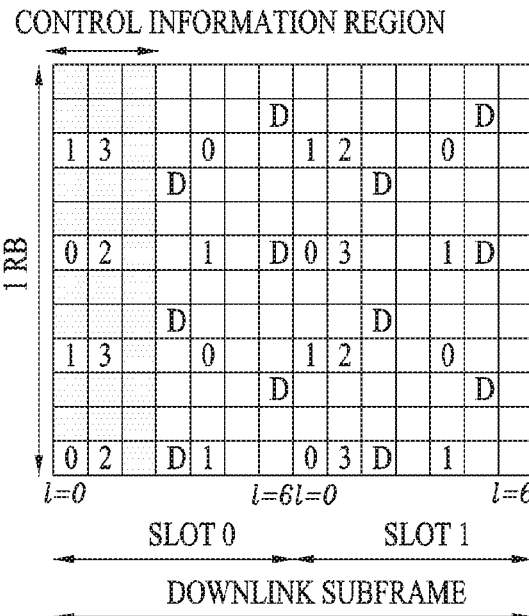
FIGS. 7 and 8 illustrate downlink Reference Signal (RS) configurations in an LTE system supporting downlink transmission through four antennas (4-Tx downlink transmission)
Figure 8:
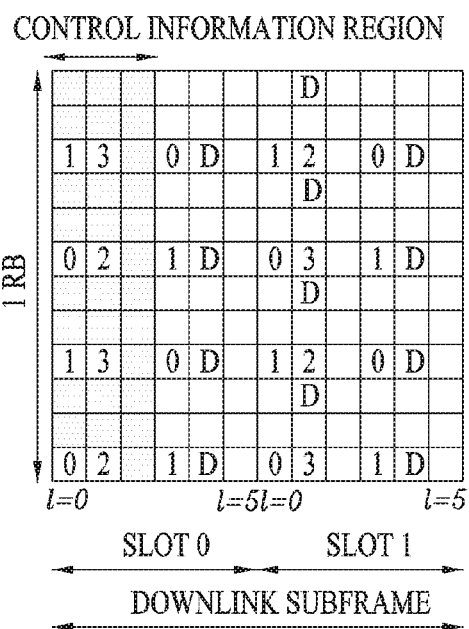

FIGS. 7 and 8 illustrate RS configurations in an LTE system supporting DL transmission through four antennas (4-Tx DL transmission). Specifically, FIG. 7 illustrates an RS configuration in the case of a normal CP and FIG. 8 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Figure 9:
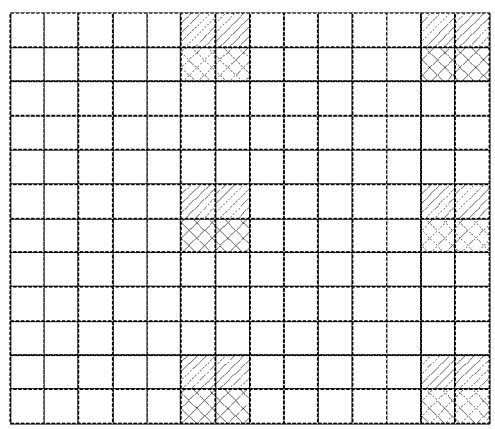
FIG. 9 illustrates an exemplary downlink Demodulation Reference Signal (DMRS) allocation defined in a current 3GPP standard specification.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

FIG. 9 illustrates an exemplary DL DMRS allocation defined in a current 3GPP standard specification.

Referring to FIG. 9, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared with CRS, CSI-RS was proposed for channel measurement of a PDSCH and up to 32 different resource configurations are available for CSI-RS to reduce Inter-Cell Interference (ICI) in a multi-cellular environment.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH(Physical Uplink Control CHannel) or a PUSCH(Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 10:
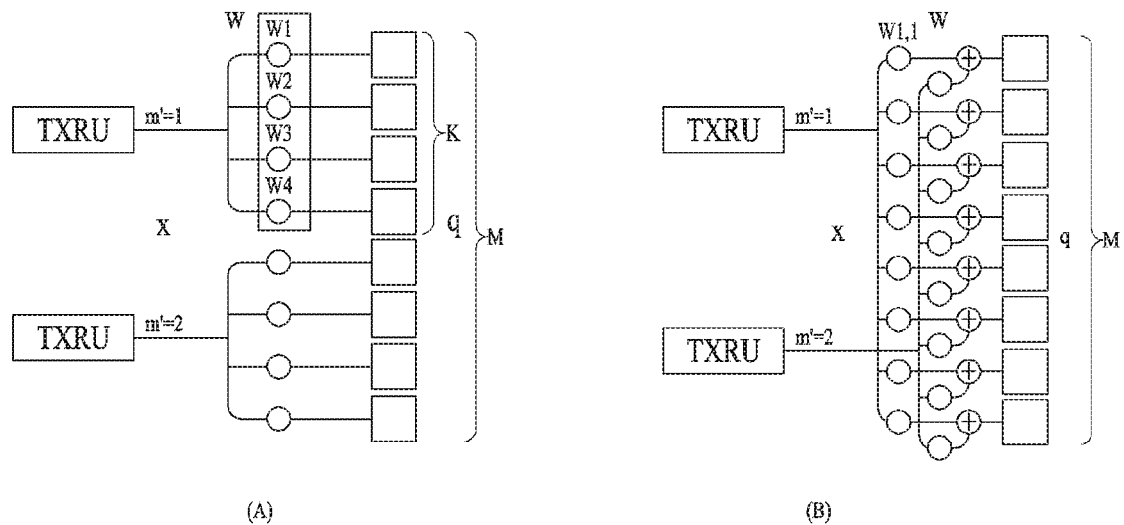
FIG. 10 illustrates examples of a connection scheme between TXRUs and antenna elements.

FIG. 10 illustrates examples of a connection scheme between TXRUs and antenna elements.

(a) of FIG. 10 illustrates that TXRU is connected to a sub-array. In this case, the antenna elements are connected to only one TXRU. Unlike (a) of FIG. 10, (b) of FIG. 10 illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
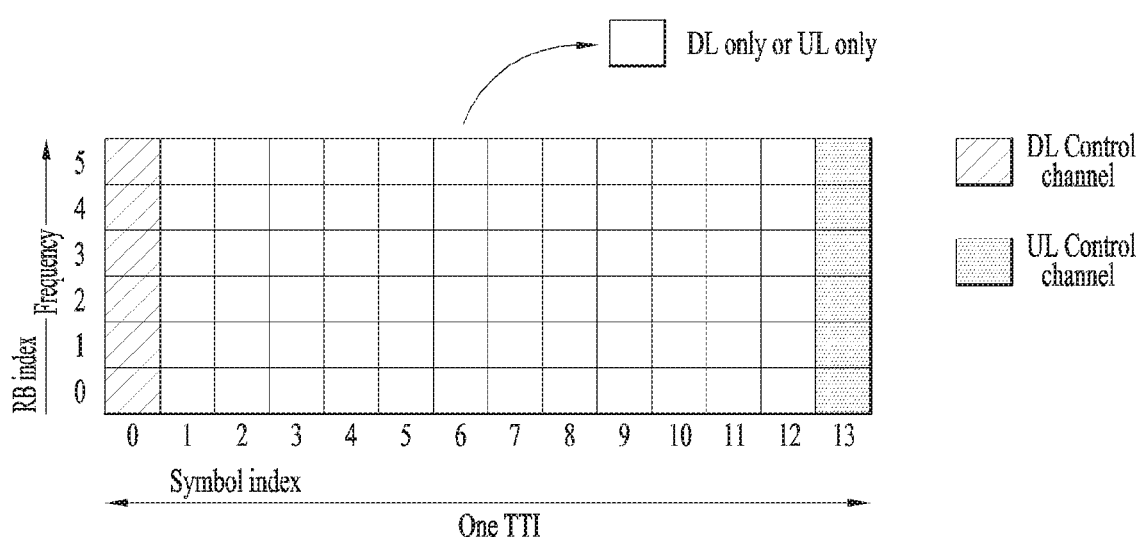
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period Meanwhile, in fifth-generation NR, the following problems may occur in DMRS transmission due to characteristics of a NewRAT (NR) system. First, since a frequency band is set to 700 MHz to 70 GHz, system bandwidth is set to 5 MHz to 1 GHz, communication may be performed at a movement speed of 0 km/h to 500 km/h, and communication may be performed indoors/outdoors and in a large cell, design requirements of the NR system are significantly broad.

Accordingly, there is a need for a method of deploying DMRSs capable of satisfying all such broad design requirements. If NR DMRSs are designed in a single pattern on the assumption of an extreme environment, resource efficiency may be considerably lowered. In contrast, if NR DMRSs are designed in various patterns, actual implementation may become complicated.

Second, initially, for the purpose of decoding data and the purpose of measuring and cancelling inter-cell interference, DMRSs of an NR system are located at a beginning part of a data channel. In this case, if DMRSs located at a front part of a subframe are used in a channel state having a high Doppler effect or a low SNR, channel estimation performance may be lowered.

Third, although the number of layers capable of being received per user is 8 in LTE-A, the number of layers capable of being received per user may be increased to 16 or more by aid of massive MIMO in NR. Accordingly, orthogonal resources need to be configured to identify DMRS antenna ports. When the number of layers increases, reference signal (RS) overhead increases and thus there is a need for an efficient orthogonal resource configuration method for identifying a large number of layers.

Fourth, since a high frequency band is used in NR, path loss is severe. In order to overcome this problem, introduction of beamforming in NR is being discussed. That is, analog beamforming, such as analog reception beamforming used on uplink, is highly likely to be introduced in a base station having a band of 4 GHz and a possibility of introducing analog beamforming in a base station and a user equipment (UE) is being increased in a band of 6 GHz or more.

When signals are omnidirectionally transmitted and received in the related art, delay spread and Doppler spread may differently appear upon applying analog beamforming. For example, Doppler spread significantly increases when signals are omnidirectionally received and a coherent time decreases when a speed increases. At this time, when analog reception beamforming is introduced, only a Doppler frequency of a signal received in a specific direction is received and Doppler spread relatively decreases and thus a coherent time increases. In this case, a DMRS additionally applied when a movement speed is high may cause unnecessary overhead.

In the present invention, in order to solve the above-described problems, a method of deploying DMRSs and additional reference signals (RSs) other than existing DMRSs will be defined and a method of deploying and transmitting the additional RSs will be proposed.

Prior to a description of the present invention, in the present invention, an existing reference signal is referred to as a basic DMRS, a fundamental DM-RS, etc. and an added DMRS is referred to as an additional RS, a high-quality RS, a high-performance RS, a supplemental DM-RS, a secondary DM-RS, an add-on DMRS, etc.

<Location of Basic DMRSs and Additional DMRSs>

According to the present invention, DMRSs of NR include a basic reference signal (that is, a basic DMRS) located at a front part of a data region and an additional reference signal (that is, an additional DMRS) transmitted in the data region of a subframe.

The basic DMRS refers to a reference signal which is always transmitted regardless of link such as uplink, downlink or special link, numerology such as carrier spacing or OFDM symbol duration, transport layer, deployment scenario such as whether a UE is located indoors/outdoors, movement speed of a UE, or transport block size.

In NR, the basic DMRS is located at the front part of the data region. In NR, initial decoding of data is an important design requirement. By transmitting the DMRS prior to a data signal, channel estimation information required for data decoding may be rapidly acquired.

Meanwhile, the frame structure of NR is designed for the purpose of commonly using a downlink, an uplink and a special link. Accordingly, in order to estimate a channel of an interference signal received from a neighboring cell or a neighboring link, coincidence of the DMRS locations of the downlink, the uplink and the special link in a subframe may be considered.

Accordingly, in a subframe structure considered in NR, start points of a downlink data region and an uplink data region may be changed according to the length of the downlink control region and presence of GP. For example, when downlink data is transmitted subsequent to a first OFDM symbol in which a control channel is transmitted, a data region may start from a second OFDM symbol. When uplink data is transmitted subsequent to a first OFDM symbol in which a control channel is transmitted, a second OFDM symbol may be used as a GP and a data region may start from a third OFDM symbol.

Figure 12:
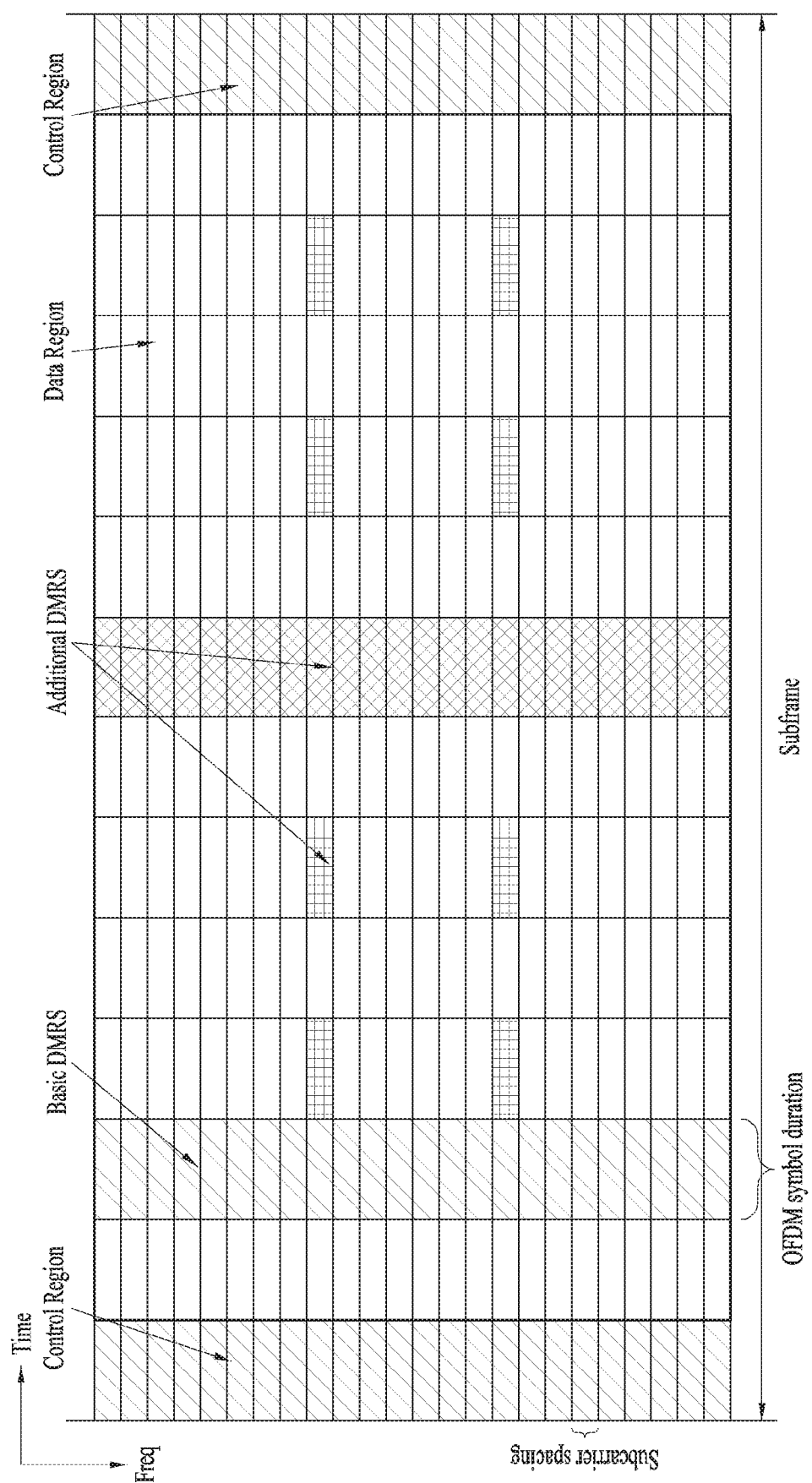
FIGS. 12 and 13 are diagrams showing an example of a basic DMRS and an additional DMRS in a self-contained subframe structure.

Since the start points of downlink data and uplink data may become different, as shown in FIG. 12, the basic DMRS may be deployed in a first symbol of OFDM symbols commonly used for data transmission in the downlink data region and the uplink data region.

Figure 13:
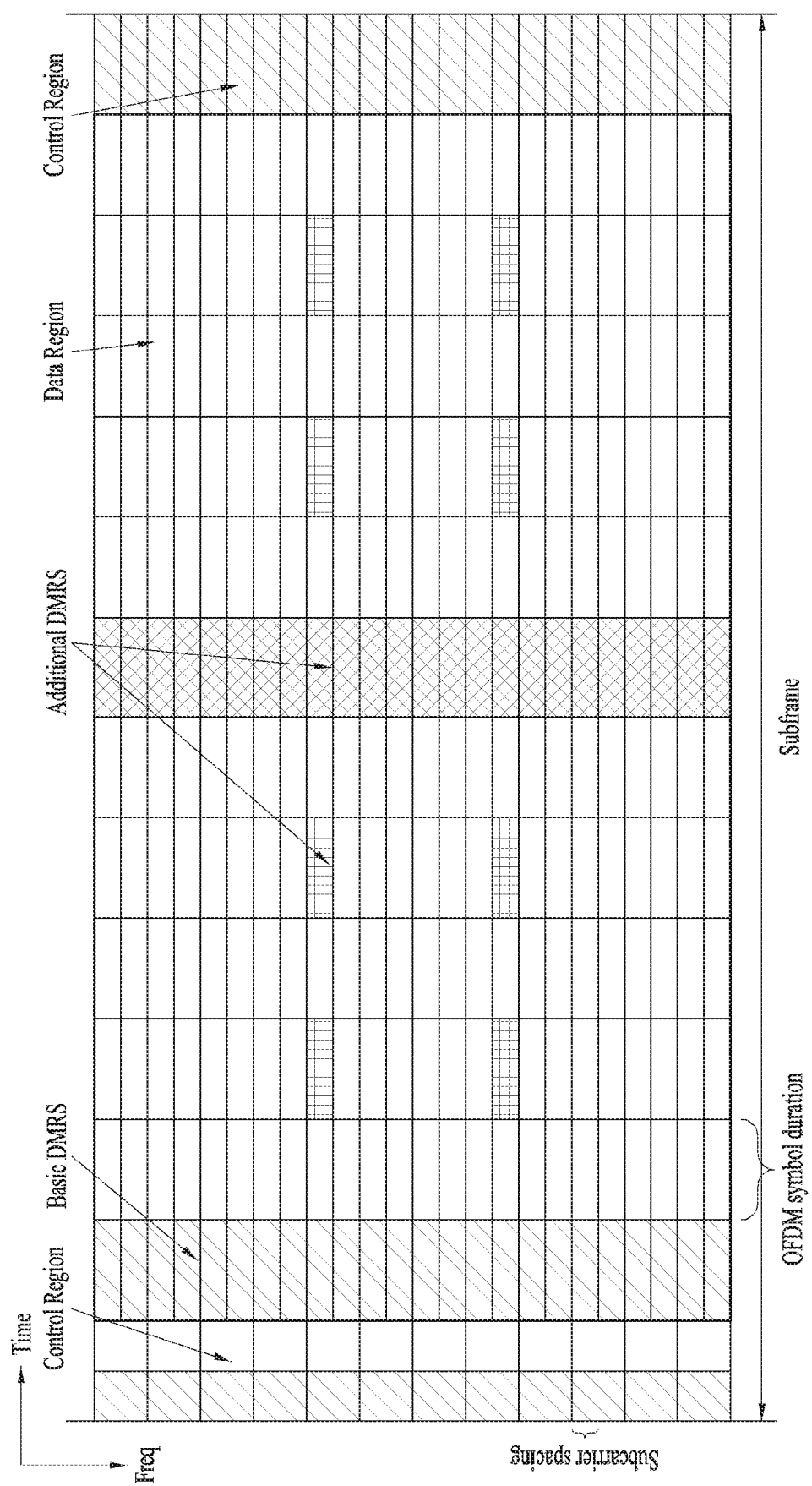

Meanwhile, the OFDM symbol length of the control region and the OFDM symbol length of the data region may be different from each other. Even in this case, as shown in FIG. 13, the basic DMRS may be deployed in a first OFDM symbol of OFDM symbols commonly used for data transmission in the downlink data region and the uplink data region after OFDM symbols occupied by a downlink control channel and a GP.

Meanwhile, the additional DMRSs may be located at a specific location of the data region and may be divided into two types as follows.

Additional DMRS Type 1 may use some resource elements and additional DMRS Type 2 may use the whole of one OFDM symbol.

In the case of additional DMRS Type 1, the additional DMRSs may be deployed as follows.

1. Embodiment 1-1

Additional DMRSs are divided in level units according to the number of resource elements for the additional DMRSs, and the number of resource elements for the additional DMRSs, that is, the level of the additional DMRSs, is adjusted according to transmission environment. At this time, one of multiple additional DMRS levels corresponds to transmission of only basic DMRS. Representatively, if the level of the additional DMRSs is 0, only the basic DMRSs may be transmitted.

2. Embodiment 1-2

Additional DMRSs of resource element units may be deployed in one resource block at a uniform spacing. Generally, in the additional DMRSs of the resource element units, antenna ports equal in number to the number of antenna ports defined in the basic DMRSs are defined. However, for the purpose of measuring change in phase between OFDM symbols using the additional DMRSs of the resource element units or in a special case where all antenna ports have similar phase change, only additional DMRSs of antenna ports less in number than the number of antenna ports defined in the basic DMRSs may be defined.

Meanwhile, in the case of additional DMRS Type 2, the additional DMRSs may be deployed as follows.

1. Embodiment 1-1

When the additional DMRSs are used in OFDM symbol units, the additional DMRSs may be deployed at a location where the number of OFDM symbols after OFDM symbol used as the basic DMRS is similar to the number of OFDM symbols after OFDM symbol used as the additional DMRS. For example, when 12 OFDM symbols are present in a data region and the basic DRMS is located at a second OFDM symbol, the additional DMRS may be deployed at a seventh OFDM symbol. As another example, when 12 OFDM symbols are present in a data region and a basic DRMS and two additional DMRSs are present, the numbers of OFDM symbols located after the respective DMRSs become similar, by deploying the basic DMRS and the additional DRMSs in first, fifth and ninth OFDM symbols. Thus, the DMRSs may be deployed in consideration of channel estimation change.

2. Embodiment 1-2

If an additional DMRS is used in OFDM symbol units, the additional DMRS may be deployed in an OFDM symbol subsequent to an OFDM symbol used as a basic DMRS. For example, if the basic DMRS is located in a second OFDM symbol, the additional DMRS is located in a third OFDM symbol. Thus, resources of the DMRSs may increase for the purpose of increasing the number of antennas in multi-antenna transmission or increasing the number of users who perform simultaneous transmission.

<Method of Changing Density of DMRSs>

As a first method of changing the density of DMRSs, there is a method of maintaining existing RSs and adding additional RSs according to an on-demand method. For example, when Doppler spread or delay spread become severe or according to a modulation and coding scheme (MCS) level, the additional RSs may be added at a high MCS level.

As a second method of changing the density of DMRSs, more or fewer RSs may be transmitted to a user, who allows change in density of DMRSs according to performance of a receiver, using an on-demand method. For example, in the case of a receiver capable of performing analog beamforming, for RS transmission assuming omnidirectional reception, transmission of fewer RSs may be requested according to the on-demand method.

As a third method, the density of RSs may be fixed in a channel for transmitting paging, random access responses, system information, etc. and may be changed in a channel for transmitting information to a specific UE.

As a fourth method, RS density control information is defined through a grant message for channel decoding. The RS density control information may include the following information.

information on the density of RSs used in a currently transmitted channel or a channel to be transmitted in the future (e.g., whether default density is used or not, information on how much the density increases/decreases from the default density, etc.)

additional DMRS level information information on additional DMRS type triggering message for channel change report As a fifth method, change in channel according to time and frequency may be reported along with a CSI report after performing short-term measurement of a UE using a CSI-RS. The channel change report may be used to determine whether the density of RSs is changed or not. In addition, the UE may transmit an RS density change request message.

As a sixth method, if a UE reports a CSI, preferred additional DMRS level information may also be reported. The preferred additional DMRS level corresponds to an additional DMRS level capable of enabling optimal throughput to be acquired when a PDSCH of an MCS corresponding to the CQI included in the CSI report is received. At this time, the UE calculates the CSI in consideration of overhead of DM-RS resource elements added according to the additional DMRS level.

As a seventh method, when the number of transport layers increases, additional RSs may be added to existing RSs.

In addition, in a data region indicated by a common control message or a common control channel, additional DMRSs may be deployed along with basic DMRSs.

In addition, when data is indicated by a UE-specific control channel or a UE-specific control message, the density of DMRSs in a subframe may be changed. To this end, a DMRS related indicator may be set in a control message. That is, DMRS density for a PDSCH or a PUSCH may be indicated through a control message. Meanwhile, a control message, in which the DMRS related indicator is set, may be transmitted to a UE in a DCI or through RRC signaling. At this time, whether the control message is included or not may be determined or the format of the included control message may be changed, according to DCI format. In addition, the UE for performing analog reception beamforming may request DMRS density change such that a base station changes DMRS density.

Figure 14:
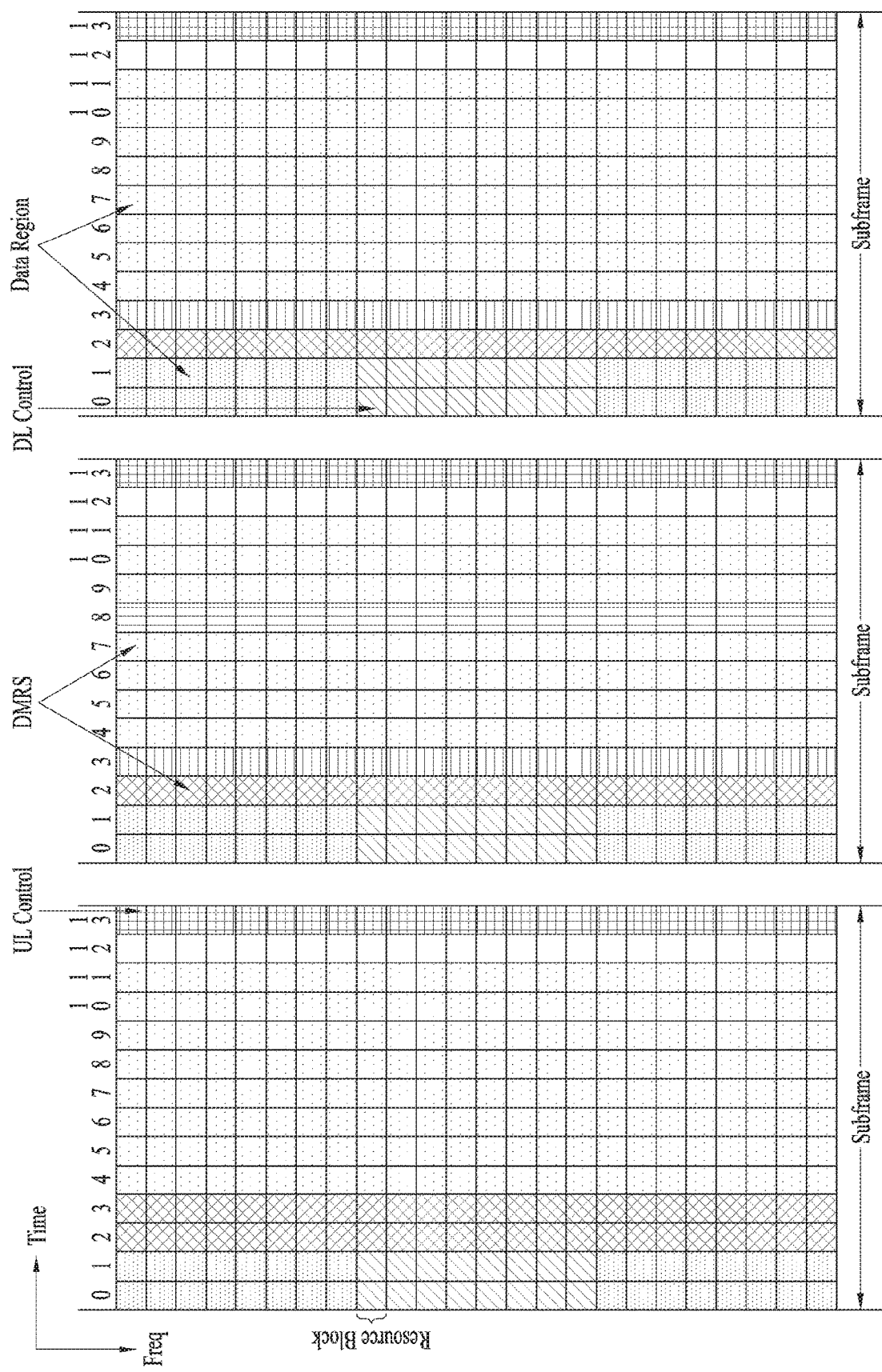
FIGS. 14 and 15 are diagrams showing an example of transmitting a DMRS for downlink data and uplink data.
Figure 15:
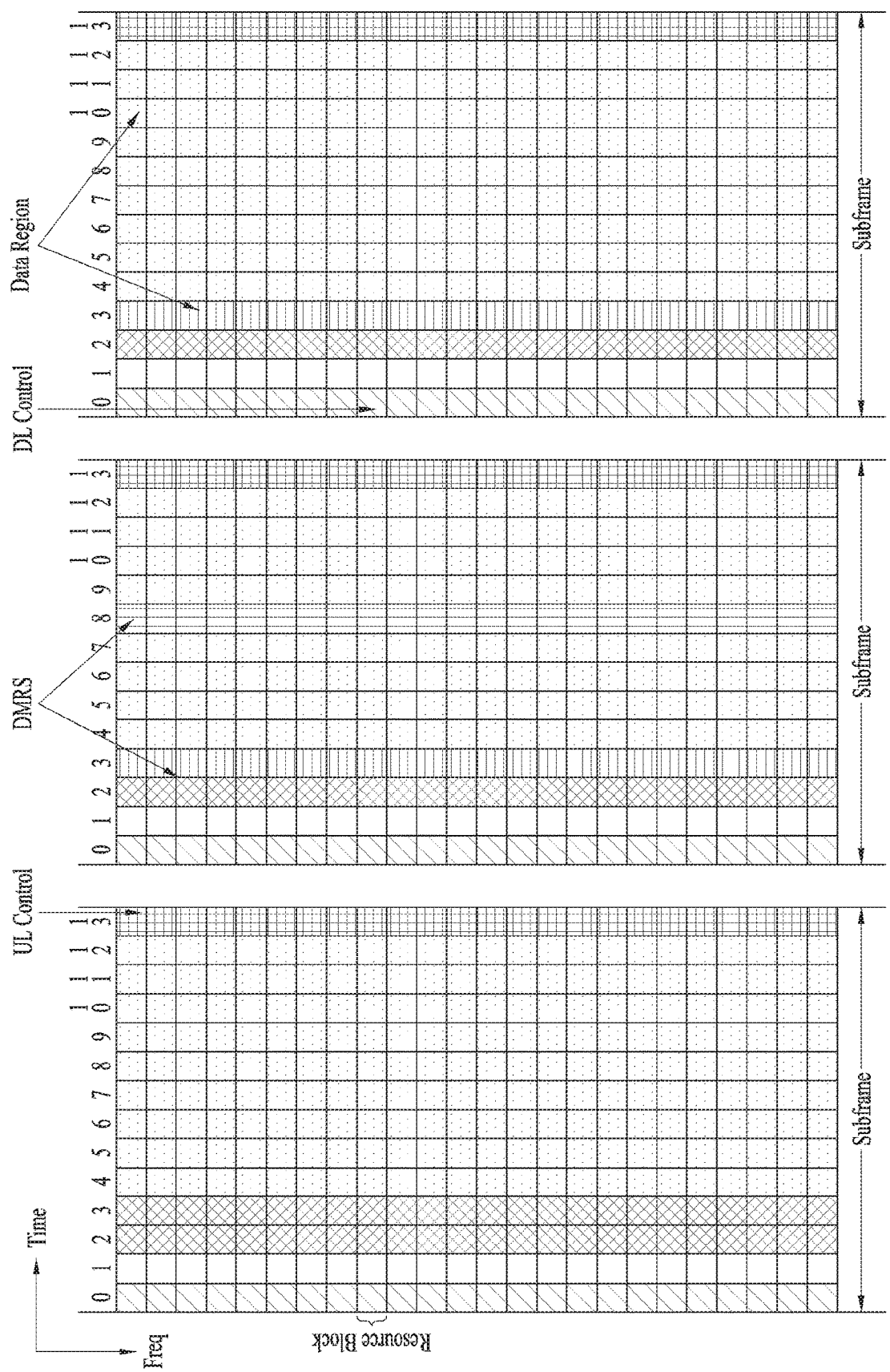

FIGS. 14 and 15 are diagrams showing an example of DMRS transmission according to an embodiment of the present invention. That is, FIGS. 14 and 15 show an embodiment in which the above-defined additional DMRS Type 2 is divided into Level 0 and Level 1 according to overhead and a DMRS is transmitted according to the level.

Referring to FIGS. 14 and 15, DMRS locations in an uplink transmission region or a downlink transmission region may coincide with each other according to the level of additional DMRS Type 2. Level 1 corresponds to the case where overhead increases and is applicable for the purpose of improving channel estimation performance upon higher rank transmission or lower rank transmission. In addition, Level 0 is applicable for the purpose of transmitting lower rank having low reference signal overhead.

As another example, in FIGS. 14 and 15, "A. Level 1 (Higher Rank)" may be used to improve channel estimation performance upon lower rank transmission, and "B. Level 1 (Lower Rank)" may be used as a pattern for higher rank.

Referring to the frame structure shown in FIGS. 14 and 15, two OFDM symbols may be used in a downlink control region. At this time, downlink data may be transmitted in a region which is not used as a downlink control region.

<Setting of Level Capable of Using Interpolation for Channel Estimation Improvement>

A QCL condition may be assumed in DMRSs transmitted at multiple levels.

For example, when QCL is assumed among a plurality of DMRSs transmitted in a single subframe, channels estimated from the DMRSs may be used for interpolation. When a QCL condition is assumed in multiple subframes, interpolation is applicable at multiple subframe levels.

In addition, when one or more mini subframes are defined in a subframe and a DMRS is transmitted per mini subframe, if QCL of a mini subframe level is assumed, interpolation between mini subframes is applicable. Meanwhile, a QCL condition is a representation of a subframe group or a multi-subframe group and may represent a time region resource unit in which interpolation is possible.

<RS Structure for Channel State Change Measurement>

As in legacy LTE, when CRSs periodically transmitted at a constant OFDM symbol duration or CSI-RSs periodically transmitted in subframe units are used, time-varying properties of a channel may be measured.

However, in NR, like the CRS, a single-beamformed RS transmitted in units of one or more OFDM symbols is not defined. Here, single-beamforming refers to a beamforming format in which a beam is not changed in time and/or frequency units.

In addition, in NR, since a frame structure supporting dynamic change in downlink and/or uplink and dynamic change in transmitted beam in OFDM symbol units and subframe units is preferred, periodic CSI-RS transmission in subframe units is difficult and thus periodic CSI-RS use is difficult. In addition, it is difficult to perform Doppler measurement by transmitting a CSI-RS once.

Although the periodically transmitted beam measurement RS is introduced, if the beam measurement RS is not transmitted at a significantly short period, it is difficult to measure change in time-varying properties of a channel using the beam measurement RS.

Accordingly, in NR, a channel measurement RS such as a CSI-RS or an SRS needs to be designed to be suitable for measurement of change in time-varying state of the channel and, in order to satisfy such requirements, the following structure of an RS for channel state change measurement is proposed.

Figure 16:
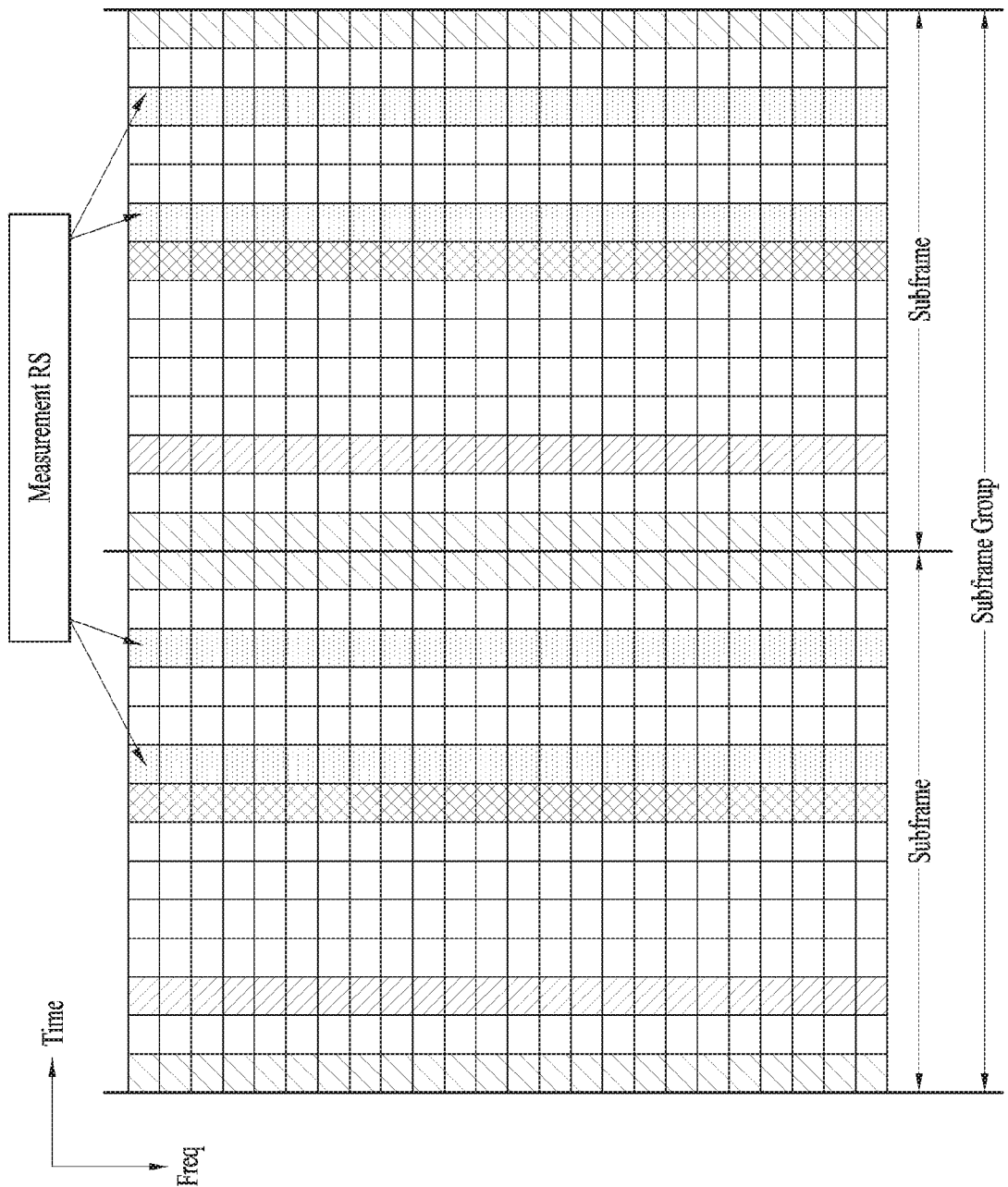
FIG. 16 is a diagram showing an example of transmitting a reference signal for measuring change in channel state.

(1) As shown in FIG. 16, multi-shot CSI-RSs or multi-shot SRSs with no change in beamforming are transmitted. To this end, CSI-RSs or SRSs are transmitted in one subframe using a multi-shot method or multi-shot CSI-RSs or multi-shot SRSs are transmitted along with an adjacent subframe or in units of a plurality of subframes. In addition, a base station may generate a message for an N-subframe group which is set on the assumption that a beamforming coefficient is not changed.

At this time, some or all of the CSI-RSs or SRSs transmitted using the multi-shot method may be used as RSs for channel state change measurement.

(2) Meanwhile, an RS for channel state change measurement may be repeatedly transmitted in a single OFDM symbol. At this time, the RS for channel state change measurement may be some or all of CSI-RSs, SRSs or phase tracking reference signals (PTRSs) allocated to a single OFDM symbol.

Meanwhile, the base station may indicate aperiodic CSI-RS transmission or whether a CSI-RS for CSI measurement and CSI report triggering of a UE is a single-shot CSI-RS or a multi-shot CSI-RS, through a DCI. In addition, when the base station transmits the multi-shot CSI-RS, the UE may perform a channel change report or a preferred additional DMRS level report.

Similarly, the base station may notify the UE whether an SRS for aperiodic SRS transmission triggering is transmitted as a single-shot SRS or a multi-shot SRS, through a DCI. In addition, when the base station transmits the multi-shot SRS, the base station notifies the UE of the number of times of continuously transmitting the SRS using the same precoding method.

Meanwhile, for efficient interference measurement, CSI-interference measurement (IM) resources as interference-specific resources may be set as multi-shot resources. Such multi-shot CSI-IM resources may be defined in one-to-one correspondence with multi-shot CSI-RS resources. That is, the base station may equally specify the number of times of transmitting the CSI-RS and CSI-IM resources through the DCI. Alternatively, the base station may individually specify the number of times of transmitting the CSI-RS and CSI-IM resources through the DCI.

<Method of Sharing RS Between Control Channel and Data Channel>

In an NR system, time division multiplexing (TDM) of a downlink control channel and/or an uplink data channel is considered. Fundamentally, in the control channel, an RS for demodulating a control channel may be defined and a DMRS for demodulating a data channel may be defined.

However, when an RS for each channel is defined, RS overhead may be extremely increased. Accordingly, as a method of reducing such RS overhead, a method of sharing a control channel RS or a data DMRS between the control channel and the data channel is being discussed.

However, such a sharing method is not always advantageous. For example, an RS of a control channel is defined as a restricted number of antenna ports and, if this is applied to a data channel, the maximum transport rank of the data channel may be restricted to become an element for restricting performance.

In addition, the RS of the control channel may be a UE-specific RS or a non-UE-specific RS.

When transmission is performed using the non-UE-specific RS, it is difficult to beamform the data channel to a specific user and thus to obtain beam gain.

In contrast, sharing of an RS may be allowed for a UE in a specific situation. That is, sharing of the RS may be allowed for UE, when a specific condition is satisfied. For example, sharing of an RS may be allowed 1) when a data channel is transmitted to a user who transmits information requiring a low data rate, 2) when UE-specific spatial channel information is not acquired or when acquired spatial channel information is not valid, or 3) when a data channel is transmitted to a user having an advantage in open-loop transmission like a high-speed movement environment. 4) Meanwhile, the specific condition can be exemplified as a condition in which information on a specific channel/reference signal is no configured That is, when the specific condition is satisfied, the receiver uses the first type RS and the second type RS together assuming the first type RS and the second type RS are associated with each other. The UE may treat the first and the second type of RSs as one RS.

In another way, when the specific condition is satisfied, the receiver may use the first type RS and the second type RS together for a same purpose.

Figure 17:
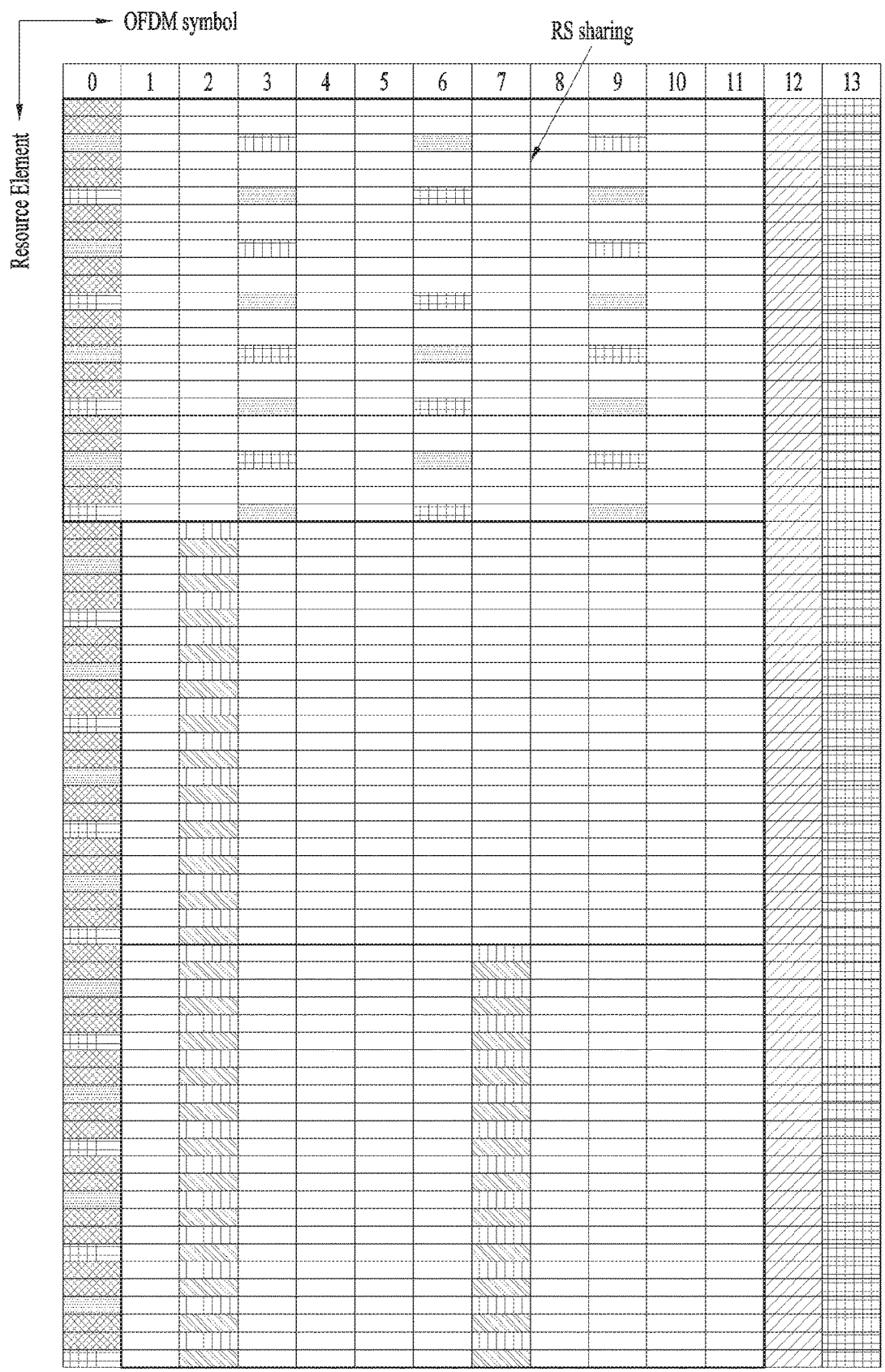
FIG. 17 is a diagram illustrating an example of sharing a reference signal in a control channel and a data channel.

A method of sharing an RS will now be described with reference to FIG. 17. Referring to FIG. 17, a data channel shares an RS defined in a control channel. At this time, assume that the RS of the control channel is a UE group specific RS. In this case, the number of transport layers is restricted by the RS of the control channel and UE specific beamforming is difficult.

Meanwhile, the RS of a DMRS region may not be used. In this case, an unused RS region may be used for data.

In addition, an additional RS may be deployed in a data region for sharing the RS of the control channel. In this case, RS overhead may not be extremely increased as compared to the DMRS in one OFDM symbol. Meanwhile, deployment of the additional RS is applicable when a basic transmission method or a fallback method is used.

In addition, for such an RS sharing method, the base station notifies the UE of information on the used RS. For example, whether the RS defined in the control channel or the RS defined in the DMRS region is used is indicated.

Alternatively, the used RS is determined according to the attributes of the data channel transmitted to the UE. For example, in association with an RNTI of a DCI for transmitting system information or a random access response, the RS of the control channel is shared in the data channel indicated by the DCI detected using the RNTI.

Meanwhile, an RS similar or equal to the RS of the control channel may be further or always transmitted in a data channel period for a user or user group which shares and uses the RS of the control channel in the data channel. This may be indicated by a higher layer. To this end, a specific indicator may be defined in the content of a control signal.

Here, sharing the RS between the control channel and the data channel may mean that the RS of the control channel and the RS of the data channel use the same sequence or the same type of sequence.

<PTRS (Phase Tracking Reference Signal)>

In a band near 30 GHz, since phase noise is sensitive in a high modulation order such as 64QAM, a PTRS for tracking a phase is required.

The PTRS may be used not only to estimate a common phase by phase noise but also to estimate a residual frequency offset.

Since common phase error is changed per OFDM symbol, an RS should be transmitted every OFDM symbol in order to estimate the common phase error. In contrast, since a frequency offset is changed according to specific tendency, an RS may be transmitted in units of N OFDM symbols to estimate the frequency offset.

Since change in common phase error is small, sensitivity of the error is acquired only in the case of complicated constellation, such as 64QAM. However, since change in frequency offset exceeds $2\pi$, sensitivity of the error is acquired even in a low modulation order such as QPSK.

In other words, an RS for estimating common phase error is required in the case of a high modulation order of a high frequency band and an RS for estimating a frequency offset is required regardless of band and modulation order. Accordingly, a PTRS for frequency offset estimation is transmitted every slot and, in some cases, a PTRS for estimating common phase error may be further transmitted.

In the present invention, for convenience, an RS transmitted for frequency offset estimation and timing tracking is referred to as a basic PTRS or a basic TRS.

Arrival timings of the frequency offset and signal may be changed according to transmission point or analog beamforming.

In addition, in downlink transmission, a base station may set a time unit for estimating a frequency offset and a timing with respect to a UE. For example, a basic TRS may be included in a time slot in which a synchronous signal is transmitted. At this time, if there is an index indicating a synchronous signal block composed of a predetermined number of OFDM symbols in which a synchronous signal is transmitted, a frequency offset and timing tracking information estimated in the synchronous signal (SS) block may be associated with an SS block index.

When a PBCH, an RS for demodulating a PBCH, a measurement RS, a beam tracking RS or the other information is associated with beam sweeping, the frequency offset and the timing tracking information may be associated with an SS block index. In addition, in the case of a single beam which is not subjected to beam sweeping, an RS using the estimated frequency offset and timing tracking information is specified.

Meanwhile, the base station may specify a time unit in which the estimated information is available. At this time, the estimated information or the information on the time unit in which the estimated information is available may include an indicator indicating whether the estimated information is available in control information for receiving specific data.

For example, when the SS block index is included in the estimated information or the information on the time unit in which the estimated information is available, the frequency offset and timing information estimated in the SS block is assumed to be applicable or resource information, etc. of the RS may be indicated through the information on the available time unit or the estimated information. Alternatively, the order of RS resources may be predetermined and indicated.

An RS used for frequency offset and/or timing tracking may be defined as a subset of the PTRS. For example, a specific port of the PTRS may be defined as a basic PTRS and a pattern having low density in time or frequency among the patterns of the PTRS may be used as a basic PTRS.

<PTRS (Phase Tracking Reference Signal) Capable of Simultaneously Supporting CP-OFDM and DFT-S-OFDM Waveform>

In a band of 30 GHz or more, inter-carrier interference and common phase error may be seriously generated due to phase noise to cause performance deterioration in a modulation order of 64QAM or more. As a method of solving this problem, there is a method of increasing a subcarrier spacing to decrease sensitivity of ICI or estimating a phase changed according to the OFDM symbol to inversely perform compensation.

In LTE, a subcarrier spacing of 15 kHz is used. In contrast, in a band near 30 GHz, a subcarrier space of 60 kHz or more is considered in order to operate NR. In addition, an RS for tracking a phase changed according to the OFDM symbol is used to track a phase and the phase is corrected based on the estimated phase upon demodulating a signal.

Meanwhile, in the present invention, an RS for phase tracking is referred to as a PTRS. The PTRS may be transmitted every OFDM symbol or every N OFDM symbols.

That is, a PTRS is transmitted at the same subcarrier location in each OFDM symbol, thereby measuring change in phase per subcarrier. In addition, for PTRS transmission, M specific resource elements are used in a resource block or a resource block group. The PTRS may be clustered and transmitted in a specific resource block or a resource block group as a cluster type, separately transmitted at the same spacing as an interleaving type, or transmitted regardless of spacing.

In a system using a CP-OFDM waveform, estimation performance may be determined according to deployment of TRSs. In a system using a DFT-S-OFDM waveform, RSs may be deployed not to interrupt PAPRs when deploying the TRSs.

In a system using a DFT-S-OFDM waveform, the PTRSs are located at specific resource elements in an OFDM symbol in which data is transmitted. At this time, the PTRSs may be deployed at the same spacing. In addition, a ZC (Zadoff-chu) sequence may be used as a sequence for the PTRS. At this time, the length of the ZC sequence may be adjusted according to the number of PTRSs used in the OFDM symbol or a ZC sequence used in a DMRS may be reused.

If the ZC sequence is reused, when elements corresponding in number to the number of PTRSs are selected from a DMRS ZC sequence stream, elements making indices have as uniform a spacing as possible may be selected from among values between a first element and a last element. For example, when six elements are selected from a DMRS sequence having a length of 36, six elements are selected at a spacing of 6.

For example, a sequence such as ({1, 7, 13, 19, 25, 31}+offset (offset={0,1,2,3,4,5})) may be selected to maintain a low PAPR upon transmitting the PTRSs.

In addition, a unit for DFT-spreading data may be defined as the number of resource elements used for data transmission. For example, when 6 RBs are allocated, 72 is used as a DFT spreading unit (In LTE, N=$2^a3^b5^c$).

At this time, the DFT spreading unit in the OFDM symbol including PTRSs is defined as the number of residual resource elements excluding the number of PTRSs. Here, N=$2^a3^b5^c$-M, wherein M is the number of PTRSs included in one OFDM symbol.

Meanwhile, similarly to legacy LTE, if the DFT spreading unit is maintained at N=$2^a3^b5^c$, the number M of PTRSs included in one OFDM symbol may be defined in the case where N-M is $2^d3^e5^f$. For example, when 8 RBs are used for data transmission and the PTRS uses two resource elements per RB, DFT spreading becomes 8×(12-2)=8×10 to maintain a relationship among the products of exponents of 2, 3 and 5 of the legacy LTE.

<Channel Estimation Unit: PRB Bundling/RE Bundling/Slot Bundling/Symbol Bundling>

In downlink DMRS based transmission of LTE-A, the weight of a transmitted beam may be changed in resource block units and, when a receiver estimates a channel from a downlink DMRS, PRB bundling for determining whether estimation is performed in units of a single resource block or a plurality of resource blocks is applied.

In addition, in the downlink DMRS of LTE-A, when a 2D-MMSE based channel estimation scheme is introduced, an RS pattern capable of obtaining optimal channel estimation performance is designed. In the 2D-MMSE channel estimation scheme, when a PRB bundling size increases, estimation complexity dramatically increases.

Meanwhile, in LTE-A downlink, a bundling size of up to 2 RBs or 3 RBs is allowed according to system band. In contrast, on LTE uplink, a channel is estimated on the assumption that a frequency balance weight is applied and a transmission weight applied to the DMRS is the same in all transport resource blocks even when channel estimation is performed using an uplink DMRS.

An LTE uplink DMRS uses all resource elements of one OFDM symbol, thereby enabling FFT based channel estimation having optimal performance in 1D and performing channel estimation even when a large RB bundling size is applied.

In addition, in a frequency selective channel, if frequency selective precoding is applied to increase beamforming performance, an RB bundling size is advantageously decreased. In addition, even when MU-MIMO pairing is performed in resource block units in order to simultaneously accommodate a plurality of users, frequency selective precoding is advantageously performed.

If a pattern for transmitting the DMRSs of 5G NR in all of resource elements included in a single OFDM symbol similarly to an LTE uplink DMRS or using the locations of resource elements having the same spacing among the resource elements included in a single OFDM symbol as RSs to perform transmission similarly to an LTE downlink CRS is designed, a receiver uses not only 2D MMSE but also an FFT based channel estimation scheme.

In addition, as a deployment scenario of 5G NR, a small cell, indoor, etc. may be considered. In particular, when analog beamforming is introduced, in consideration of increase in coherent band of a radio channel, the same precoding weight may be used in a frequency band having a predetermined level, rather than applying extreme frequency selective precoding.

That is, in NR, an RB bundling size may be greater than 2 RBs or 3 RBs of LTE-A downlink. Meanwhile, an RB bundling unit is applicable as a consecutive resource unit of allocated frequency resources.

In contrast, a channel is estimated on the assumption that the same weight is applied to an LTE-A downlink DMRS and uplink DMRS within a PRB. In contrast, in an NR DMRS, a RE bundle or OFDM symbol bundle unit or a frequency-axis and/or time-axis combination may be considered. The RE bundle or OFDM symbol bundle unit may assist beam cycling or beam sweeping.

In particular, if it is assumed that a plurality of OFDM symbols is present in a slot in which data is transmitted and a channel estimated from a DMRS included in a specific OFDM symbol is applicable to the OFDM symbols, a bundle of adjacent OFDM symbols or specific OFDM symbols present in a slot, when analog and/or digital beams are swept within the slot in OFDM symbol or OFDM symbol bundle units, beam diversity can be accomplished.

Similarly, if it is assumed that a channel estimated using a DMRS located at a specific resource element in a resource block is applicable to the resource element, a bundle of adjacent resource elements, resource elements in the resource block or resource elements in the resource block bundle, beam diversity for changing the digital beam within the resource block or the resource block bundle can be accomplished.

Meanwhile, RB bundling in downlink may be assumed in channel estimation units, but RB bundling in uplink may be assumed in units applied by a precoder. That is, in uplink transmission, the UE receives an RB size applied by the precoder from the base station, thereby applying precoding. At this time, the RB size may be specified in RB, RB group or allocated whole band units.

<Design Criteria>

Maximum spectral efficiency required in an NR system is 30 bps/Hz on downlink and is 15 bps/Hz (UL) on uplink, which is equal to spectrum efficiency of 3GPP LTE-A. In LTE-A, modulation is 64QAM, the number of transport layers is 8 on downlink and 4 on uplink, and requirements are 30 bps/Hz (DL) and 15 bps/Hz (UL).

Similarly, in consideration of spectral efficiency requirements of the NR system, the number of transport layers may be maximally 8 on downlink and 4 on uplink. In addition, as the number of antennas of the base station is increased, the number of antenna ports may be increased. It is assumed that the maximum number of the layers capable of being transmitted by the base station is 16. In addition, the maximum number of layers capable of being received by the base station on uplink is 16.

That is, the number of transmission/reception layers required in the NR system is as follows.

* the number of Point-to-Point transport layers is assumed
  SU transmission: maximum 8(DL), maximum 4(UL),
  MU transmission: maximum 4 (DL), maximum 4(UL)
* the maximum number of layers transmitted/received by the base station is assumed
  maximum 16(DL), 8(UL)

In this design, an NR DMRS is designed on the following assumption.

A maximum of eight antenna ports is supported per UE
A maximum of 16 antenna ports transmittable simultaneously is supported Resources are set such that a maximum of eight antenna ports is identified in one OFDM symbol Each antenna port (AP) has energy of a minimum of 2 REs or 3 REs This means that, when 16 resource elements are used for eight antenna ports, two resource elements are used per antenna port and, when 24 resource elements are used, three resource elements are used per antenna port. In this design, assume that a resource block includes 16 resource elements or 24 resource elements, which is a multiple of 8.

<Multiplexing Method in Single OFDM Symbol>

As a method of multiplexing a plurality of antenna ports in a single OFDM symbol, there is an FDM method using different frequency resources per antenna port and a CDM method of separately using code resources in the same resources.

Figure 18:
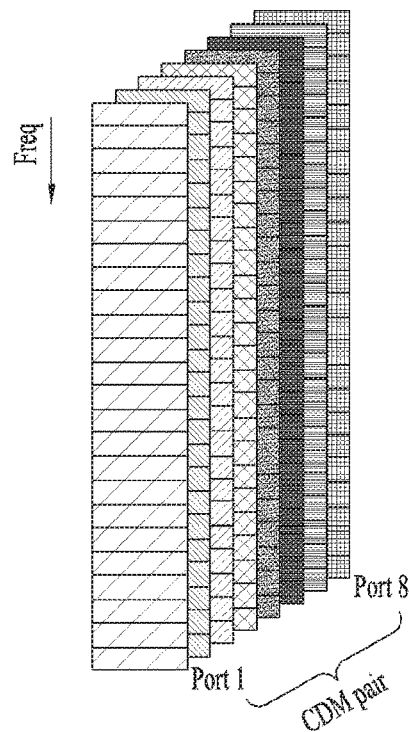
FIG. 18 is a diagram illustrating a method of spreading DMRSs in N REs using a CDM method and transmitting the DMRSs using eight orthogonal codes according to an embodiment of the present invention.

FIG. 18 is a diagram illustrating a method of spreading DMRSs in N REs using a CDM method and transmitting the DMRSs using eight orthogonal codes according to an embodiment of the present invention.

That is, FIG. 18 shows an example of using orthogonal codes in N resource elements, wherein all antenna ports share a scrambling sequence (e.g., PN sequence, CAZAC, etc.) having a length of N used in an allocated band and eight orthogonal sequences (e.g., DFT or Hadamard) having a length of N are allocated to an AP.

Figure 19:
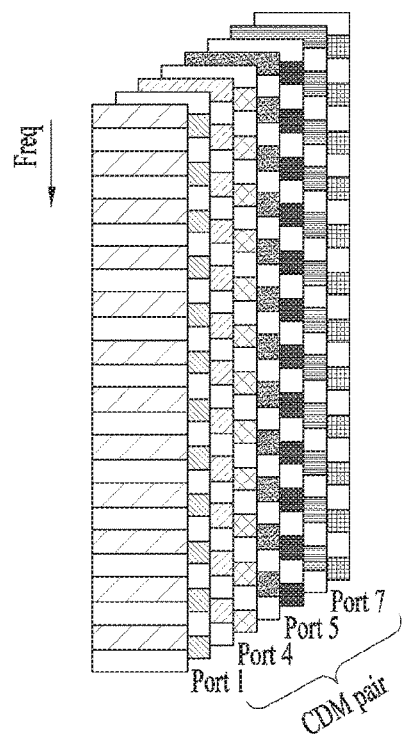
FIG. 19 is a diagram illustrating a method of combining and using FDM and CDM according to an embodiment of the present invention.

FIG. 19 is a diagram illustrating a method of combining and using FDM and CDM according to an embodiment of the present invention.

FIG. 19 shows an example of using frequency resources and orthogonal codes in N resource elements, wherein N resource elements are divided by N/2 according to even number and odd number and orthogonal codes for identifying four antenna ports are used in each group. In a scrambling sequence (e.g., PN sequence, CAZAC, etc.) having a length of N used in an allocated band, two subset sequences are used as even and odd-numbered indices and the subset sequences share antenna ports. Four orthogonal sequences (e.g., DFT, Hadamard) having a length of N/2 are allocated to antenna ports.

A scrambling sequence having a length of N/2 used in an allocated band is equally used in two frequency resources and four orthogonal sequences having a length of N/2 are allocated to antenna ports.

Figure 20:
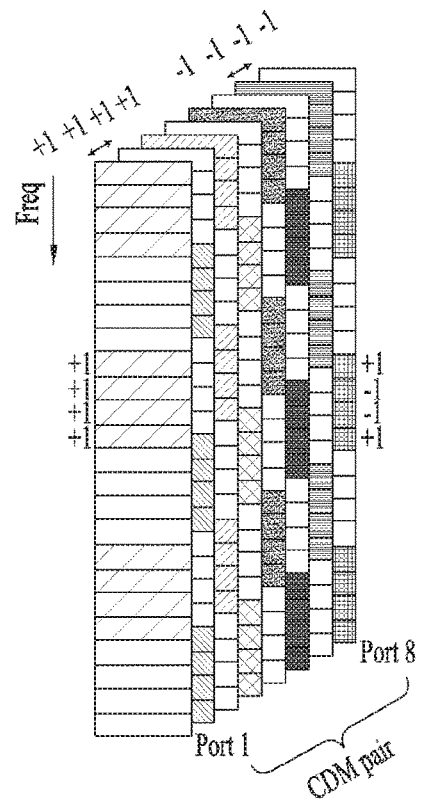
FIG. 20 is a diagram illustrating a method of combining and using FDM and OCC according to an embodiment of the present invention.

FIG. 20 is a diagram illustrating a method of combining and using FDM and OCC according to an embodiment of the present invention.

That is, as an example of using frequency resources and orthogonal codes in N resource elements, a bundle of four consecutive frequency resources is generated and four orthogonal code resources are allocated to four antenna ports in the bundle of frequency resources. In other words, another bundle of frequency resources is generated in four adjacent resource elements and four orthogonal code resources are allocated to four other antenna ports.

If N resource elements are used per resource block, a total of N/4 resource bundles having four consecutive frequencies is generated and four antenna ports use resource bundles separated from each other at a spacing of 4 REs. A scrambling sequence having a length of N/4 defined in the resource block is used in each of N/4 frequency bundles.

Figure 21:
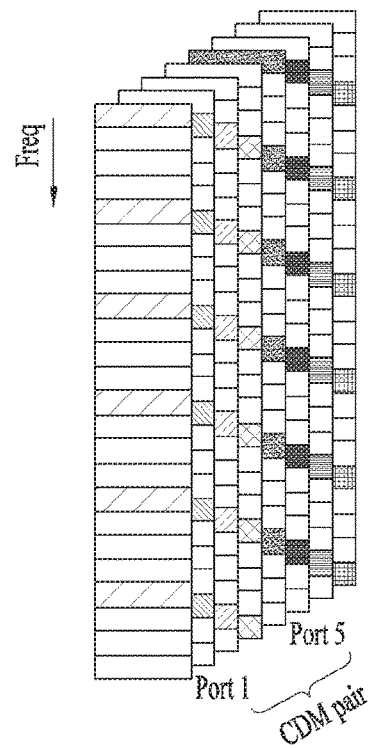
FIG. 21 is a diagram illustrating a method of combining and using FDM and CDM according to another embodiment of the present invention.

FIG. 21 is a diagram illustrating a method of combining and using FDM and CDM according to another embodiment of the present invention.

A total of four frequency resource bundles each having resources having a spacing of 4 REs is generated and two antenna ports are identified as orthogonal resources in four frequency resource bundles.

A scrambling sequence having a length of N defined in the resource block is mapped every resource element and different scrambling sequences may be mapped between frequency resource bundles. As two orthogonal resources, OCC-2 ([+1+1], [+1−1]) may be used.

A scrambling sequence having a length of N/4 defined in the resource block is mapped to resource elements belong to a frequency resource bundle and the frequency resource bundles may use the same scrambling sequence as a basic sequence. In addition, a special offset sequence may be introduced between the frequency resource bundles. As two orthogonal resources, OCC-2 ([+1+1], [+1−1]) may be used.

Figure 22:
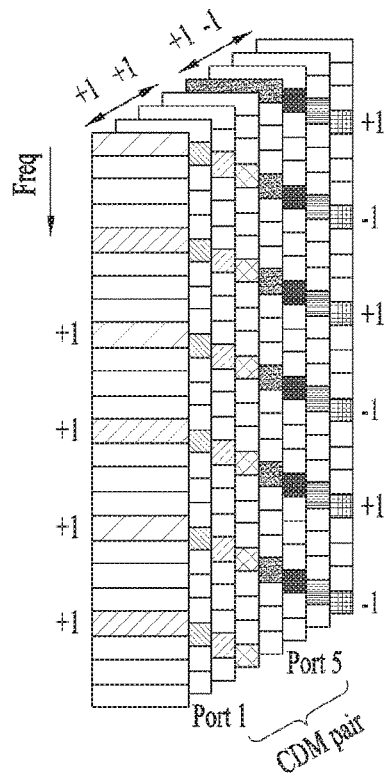
FIGS. 22 and 23 are diagrams illustrating a method of combining and using FDM and OCC according to another embodiment of the present invention.
Figure 23:
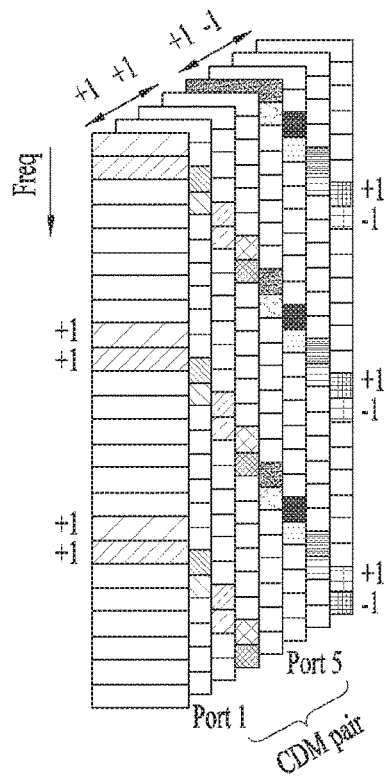

FIGS. 22 and 23 are diagrams illustrating a method of combining and using FDM and OCC according to another embodiment of the present invention.

In FIG. 22, a total of four frequency resource bundles each having resources having a spacing of 4 REs is generated and two antenna ports are identified as orthogonal resources in the four frequency resource bundles.

In FIG. 23, two consecutive resource elements are set as OCC units and a total of four OCC groups is generated in eight resource elements. A scrambling sequence having a length of N/2 defined in the resource block is mapped to and used in each OCC group.

Figures 24, 25:
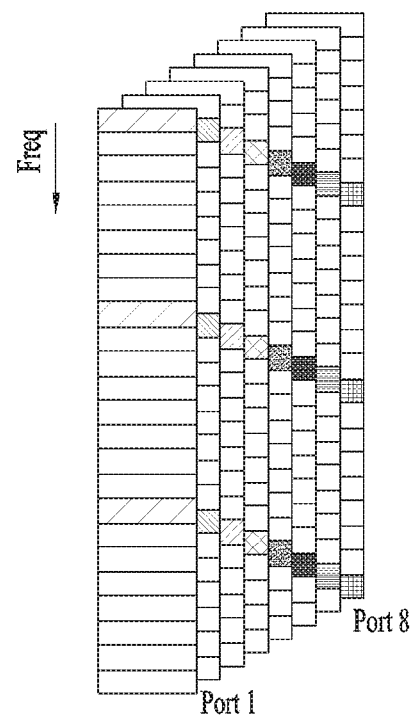
FIG. 24 is a diagram illustrating a method of using FDM at a spacing of eight REs per antenna port according to another embodiment of the present invention.
FIG. 25 is a diagram showing a method of applying FDM and CDM according to an embodiment of the present invention.

FIG. 24 is a diagram illustrating a method of using FDM at a spacing of eight REs per antenna port according to another embodiment of the present invention.

According to the embodiment of FIG. 24, the number of resource elements per port may be fixed regardless of the number of layers. For example, the number of resource elements per port may be fixed to "N-RE/maximum number of antenna ports". Meanwhile, the number of resource elements per port may be changed according to the number of layers. For example, the number of resource elements per port may be changed to 1) single layer: 24 REs per port, 2) 2-layer: 12 REs per port, 3) 3-layer: 8 REs per port, 4) 4-layer: 6 REs per port, 5) 6-layer: 4 REs per port, 6) 8-layer: 3 REs per port.

In addition, five ports may be used in a DMRS pattern for 6-layer in the case of 5-layer and seven ports may be used in a DMRS pattern for 8-layer in the case of 7-layer.

Although the DMRS resource allocation method for a maximum of eight antenna ports was described in the above-described methods, a resource allocation method for less than 8 antenna ports may be used. For example, if a maximum of four antenna ports is assumed, the subset of the above-described method may be used. If the number of antenna ports is maximally increased to 8, one OFDM symbol may be further used. For example, OCC-2 may be applied to two OFDM symbols to identify antenna ports. In Table 1 below, eight antenna ports and 24 REs in LTE-A are assumed.

TABLE 1

| | Number of APs | | | | | | | |
|---|---|---|---|---|---|---|---|---|
| | 1 | 2 | 3 | 4 | 5 | 6 | 7 | 8 |
| RE/AP | 12 | 6, 6 | 6, 6, 12 | 6, 6, 6, 6 | 3, 3, 6, 6 3 | 3, 3, 3, 3 3 3 | 3, 3, 3, 3 3, 3, 3 | 3, 3, 3, 3 3, 3, 3, 3 |

<Sequence for CDM>

In the case of a legacy LTE uplink DMRS, a ZC sequence is used as a base sequence. Additionally, in order to apply time-domain cyclic shift, a DFT vector $\exp(j*2*pi*n*k/12)$ having a spacing of 12 is used, eight vectors of 12 orthogonal vectors are used, and use of such vectors is repeatedly applied in units of 12 REs.

In a new system, in a method of multiplexing eight orthogonal DMRS antenna ports in one OFDM symbol, a method of applying CDM or OCC to a frequency axis may be considered.

1. Embodiment 2-1

If time-domain cyclic shift is applied, a DFT vector $\exp(j*2*pi*n*k/8)$ having a spacing of 8 is used. In this case, in impulse responses to the radio channels of eight layers, the layers may be deployed to be separated at a maximum spacing in the time domain. In particular, this is applicable to a pattern using eight orthogonal DMRS antenna ports in CDM. At this time, as an orthogonal sequence, Hadamard-8 is applicable.

At this time, if 12 REs are defined as 1 RB, when a vector having a length of 8 is deployed in 12 resource elements, a vector of one cycle and a part of the vector are mapped. For example, when a vector having a length of 8 is $[S_n(0)\ S_n(1)\ S_n(2)\ S_n(3)\ S_n(4)\ S_n(5)\ S_n(6)\ S_n(7)]$, the mapping order of 12 REs is as follows.

12-RE mapping: $[S_n(0)\ S_n(1)\ S_n(2)\ S_n(3)\ S_n(4)\ S_n(5)\ S_n(6)\ S_n(7)\ S_n(0)\ S_n(1)\ S_n(2)\ S_n(3)]$ In addition, as a method of making sequences mapped to multi-RB have consecutive phases, as shown in Table 2 below, a mapping relationship may be set according to RB number.

TABLE 2

| | 0 | 1 | 2 | 3 | 4 | 5 | 6 | 7 | 8 | 9 | 10 | 11 |
|---|---|---|---|---|---|---|---|---|---|---|---|---|
| Even (/Odd) number RB | $[S_n(0)$ | $S_n(1)$ | $S_n(2)$ | $S_n(3)$ | $S_n(4)$ | $S_n(5)$ | $S_n(6)$ | $S_n(7)$ | $S_n(0)$ | $S_n(1)$ | $S_n(2)$ | $S_n(3)]$ |
| Odd (/Even) number RB | $[S_n(4)$ | $S_n(5)$ | $S_n(6)$ | $S_n(7)$ | $S_n(0)$ | $S_n(1)$ | $S_n(2)$ | $S_n(3)$ | $S_n(4)$ | $S_n(5)$ | $S_n(6)$ | $S_n(7)]$ |

2. Embodiment 2-2

If time-domain cyclic shift is applied, a DFT vector $\exp(j*2*pi*n*k/4)$ having a spacing of 4 is used. In this case, in impulse responses to the radio channels of four layers, the layers may be deployed to be separated at a maximum spacing in the time domain. In particular, this is applicable to a pattern using four orthogonal DMRS antenna ports in CDM. At this time, as an orthogonal sequence, Hadamard-4 is applicable.

When orthogonal DMRS antenna ports are defined in FDM and CDM, if 12 REs are defined as 1 RB, CDM is applicable in units of 6 REs to identify four DMRS antenna ports and four other DMRS antenna ports may be defined in 6 other RE resources in CDM. At this time, in mapping of a vector having a length of 4 to 6 REs, one cycle and a half cycle of the vector are mapped similarly to the above-described mapping. Even at this time, similarly, as a method of making sequences mapped to multi-RB have consecutive phases, as shown in Table 3 below, a mapping relationship may be set according to RB number.

TABLE 3

| | 0 | 1 | 2 | 3 | 4 | 5 | 6 | 7 | 8 | 9 | 10 | 11 |
|---|---|---|---|---|---|---|---|---|---|---|---|---|
| Even (/Odd) number RB | $[S_n(0)$ | — | $S_n(1)$ | — | $S_n(2)$ | — | $S_n(3)$ | — | $S_n(0)$ | — | $S_n(1)$ | — ] |
| Odd (/Even) number RB | $[S_n(2)$ | — | $S_n(3)$ | — | $S_n(0)$ | — | $S_n(1)$ | — | $S_n(2)$ | — | $S_n(3)$ | — ] |

<Method of Applying FDM and CDM>

In resource mapping configuring 12 REs as 1 RB, four antenna ports are identified in six resource elements through CDM and four other antenna ports are identified in six other resource elements.

FIG. 25 is a diagram showing a method of applying FDM and CDM according to an embodiment of the present invention.

Specifically, (A) of FIG. 25 shows a method of grouping two consecutive resource elements and deploying groups at a spacing of 2 REs. Meanwhile, (B) of FIG. 25 shows grouping of resource elements having a spacing of 2 REs.

In two groups G1 and G2, four antenna ports may be identified. At this time, the above-described CDM code is applicable to each group.

In downlink transmission, in the case of multi-user transmission, the base station may allocate DMRS ports for channel estimation of multiple users in an FDM and CDM group. The base station may indicate DMRS ports to be used by the users and specify DMRS ports used by individual users. When multiple users are allocated DMRS antenna ports and the UE knows the DMRS port information of the other users, it is possible to improve channel estimation performance.

For example, when the UE is allocated two DMRS ports and thus two sequences are selected from CDM, the UE may average two resource elements to identify two DMRS antenna ports. For other UEs, since the remaining two sequences in the CDM are likely to be allocated, the UE may average four resource elements to identify two DMRS antenna ports.

In consideration of frequency selection of the radio channel, resource elements located at a short distance are preferably averaged. Better channel estimation performance may be obtained when two REs are averaged rather than when four REs are averaged. In multi-user transmission, when the base station notifies the UE of multi-user multiplexing related information or length information of the CDM, the UE may adjust the averaging unit upon channel estimation. For example, an indicator indicating whether CDM-2 (using an orthogonal resource having a length of 2) or CDM-4 (using an orthogonal resource having a length of 4) is used, which is signaled to the UE, may be set.

Figure 26:
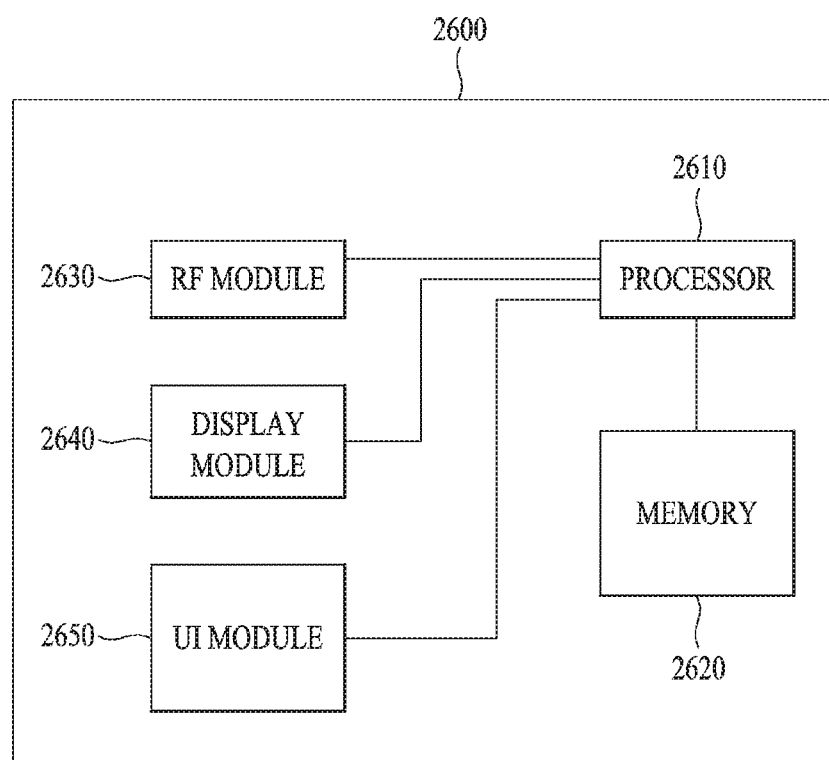
FIG. 26 is a block diagram of a communication apparatus according to an embodiment of the present disclosure.

FIG. 26 is a block diagram of a communication apparatus according to an embodiment of the present disclosure.

Referring to FIG. 26, a communication apparatus 2600 includes a processor 2610, a memory 2620, an RF module 2630, a display module 2640, and a User Interface (UI) module 2650.

The communication device 2600 is shown as having the configuration illustrated in FIG. 26, for the convenience of description. Some modules may be added to or omitted from the communication apparatus 2600. In addition, a module of the communication apparatus 2600 may be divided into more modules. The processor 2610 is configured to perform operations according to the embodiments of the present disclosure described before with reference to the drawings. Specifically, for detailed operations of the processor 2610, the descriptions of FIGS. 1 to 25 may be referred to.

The memory 2620 is connected to the processor 2610 and stores an Operating System (OS), applications, program codes, data, etc. The RF module 2630, which is connected to the processor 2610, upconverts a baseband signal to an RF signal or downconverts an RF signal to a baseband signal. For this purpose, the RF module 2630 performs digital-to-analog conversion, amplification, filtering, and frequency upconversion or performs these processes reversely. The display module 2640 is connected to the processor 2610 and displays various types of information. The display module 2640 may be configured as, not limited to, a known component such as a Liquid Crystal Display (LCD), a Light Emitting Diode (LED) display, and an Organic Light Emitting Diode (OLED) display. The UI module 2650 is connected to the processor 2610 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although an example of applying a method of transmitting a reference signal for channel state change measurement and an apparatus therefor to a fifth-generation NewRAT system is focused upon, these are applicable to various wireless communication systems in addition to the fifth-generation NewRAT system.

The invention claimed is:

1. A method for receiving reference signals by a receiver in a wireless communication system, the method comprising:
  receiving, from a transmitter, resource information; and
  receiving, from the transmitter, a first type reference signal and a second type reference signal based on the resource information,
  wherein the resource information includes information on a first resource element (RE) group for the second type reference signal in an orthogonal frequency division multiplexing (OFDM) symbol, and the information informs the UE whether or not a second RE group in the OFDM symbol is used for receiving data,
  wherein each of the first RE group and the second RE group includes REs having a predetermined interval in the OFDM symbol,
  wherein the second type reference signal is received in the first RE group and the data is received or not in the second RE group based on the resource information,
  wherein sequence elements of the first type reference signal are determined among sequence elements of the second type reference signal at equal element intervals, and wherein the first type reference signal is received every N OFDM symbols, wherein N is greater than 1.

2. The method according to claim 1, wherein the first type reference signal is a phase tracking reference signal (PTRS), and
wherein the second type reference signal is one of a channel state information-reference signal (CSI-RS), a common reference signal (CRS) and a demodulation reference signal (DM-RS).

3. The method according to claim 1, wherein the first type reference signal and the second type reference signal are generated based on a same type of reference signal sequences.

4. The method according to claim 1, wherein the first type reference signal is received when an indication indicating the first type reference signal being used is received.

5. The method according to claim 1, wherein the second type reference signal is generated based on a cyclic prefix-OFDM (CP-OFDM) method.

6. The method according to claim 1, wherein the sequence elements of the first reference signal are the sequence elements of the second reference signal mapped to a same symbol.

7. The method according to claim 1, wherein a first sequence element of the first reference signal is determined as sequence element of the second reference signal related to an offset.

8. An apparatus for receiving a reference signal in a wireless communication system, the apparatus comprising:
a radio frequency (RF) module configured to transmit and receive an RF signal to or from a transmitter; and
a processor connected to the RF module,
wherein the processor configured to:
receive, from the transmitter, resource information; and
receive, from the transmitter, a first type reference signal and a second type reference signal based on the resource information,
wherein the resource information includes information on a first resource (RE) element group for the second type reference signal in an orthogonal frequency division multiplexing (OFDM) symbol, and the information informs the UE whether or not a second RE group in the OFDM symbol is used for receiving data,
wherein each of the first RE group and the second RE group includes REs having a predetermined interval in the OFDM symbol,
wherein the second type reference signal is received in the first RE group and the data is received or not in the second RE group based on the resource information,
wherein sequence elements of the first type reference signal are determined among sequence elements of the second type reference signal at equal element intervals, and
wherein the first type reference signal is received every N OFDM symbols, wherein N is greater than 1.

9. The apparatus according to claim 8,
wherein the first type reference signal is a phase tracking reference signal (PTRS), and
wherein the second type reference signal is one of a channel state information-reference signal (CSI-RS), a common reference signal (CRS) and a demodulation reference signal (DM-RS).

10. The apparatus according to claim 8, wherein the first type reference signal and the second type reference signal are generated based on a same type of reference signal sequences.

11. The apparatus according to claim 8,
wherein the first type reference signal is received, when the RF module receives an indication indicating the first type reference signal being used.

12. The apparatus according to claim 8, wherein the sequence elements of the first reference signal are the sequence elements of the second reference signal mapped to a same symbol.

13. The apparatus according to claim 8, wherein a first sequence element of the first reference signal is determined as sequence element of the second reference signal related to an offset.

14. The apparatus according to claim 8, wherein the second type reference signal is generated based on a cyclic prefix-OFDM (CP-OFDM) method.

\* \* \* \* \*